United States Patent
Mueller et al.

(10) Patent No.: US 11,110,487 B2
(45) Date of Patent: Sep. 7, 2021

(54) APPARATUSES AND METHODS FOR PRODUCING OPTICAL EFFECT LAYERS

(71) Applicant: SICPA HOLDING SA, Prilly (CH)

(72) Inventors: Edgar Mueller, Lausanne (CH);
Evgeny Loginov, Renens (CH);
Mathieu Schmid, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/482,680

(22) PCT Filed: Jan. 17, 2018

(86) PCT No.: PCT/EP2018/051084
§ 371 (c)(1),
(2) Date: Jul. 31, 2019

(87) PCT Pub. No.: WO2018/141547
PCT Pub. Date: Aug. 9, 2018

(65) Prior Publication Data
US 2020/0246828 A1    Aug. 6, 2020

(30) Foreign Application Priority Data
Jan. 31, 2017    (EP) .................................... 17153905

(51) Int. Cl.
*H01F 41/16*    (2006.01)
*B05D 3/00*    (2006.01)
(Continued)

(52) U.S. Cl.
CPC ............. *B05D 3/207* (2013.01); *B05D 3/067* (2013.01); *B05D 5/06* (2013.01); *B42D 25/369* (2014.10);
(Continued)

(58) Field of Classification Search
CPC . B05D 3/207; B05D 5/06; B05D 3/00; B05D 5/065; B05D 5/063; B42D 25/369;
(Continued)

(56) References Cited

U.S. PATENT DOCUMENTS 2,570,856 A    10/1951    Carlton et al.
3,676,273 A    7/1972    Graves
(Continued)

FOREIGN PATENT DOCUMENTS

CN    102529326    7/2012
EP    0406667    1/1995
(Continued)

OTHER PUBLICATIONS

J.H.E. Promislow et al. (Aggregation kinetics of paramagnetic colloidal particles, J. Chem. Phys., 1995, 102, p. 5492-5498).
(Continued)

*Primary Examiner* — Tabassom Tadayyon Eslami
(74) *Attorney, Agent, or Firm* — Muncy, Geissler, Olds & Lowe, P.C.

(57) ABSTRACT

The present invention relates to the field of apparatuses and methods of producing optical effect layers (OEL) comprising magnetically oriented magnetic or magnetizable pigment particles. In particular, the present invention relates to apparatuses comprising a first block (A) comprising a holder (1a) having mounted thereto a stator comprising n magnet-wire coils (1b) disposed in n annular slots of a magnetic-field-guiding stator core (1c), and a second block (B) comprising a casing (4), a rotor protection plate (2), a rotor comprising m permanent magnet poles (3a) of alternating polarity arranged around a circle in or on one side of a rotor disc (3b), and a permanent magnet assembly (PMA) (5), wherein the holder (A) is configured to be removeably fixed to a base of a rotating magnetic orienting cylinder (RMC) or
(Continued)

a flatbed (FB) magnetic orienting printing unit and the second block (B) is removeably fixed to the first block (A).

15 Claims, 9 Drawing Sheets

(51) Int. Cl.
*B42D 25/369* (2014.01)
*B42D 25/41* (2014.01)
*B05D 3/06* (2006.01)
*B05D 5/06* (2006.01)
*H02K 5/173* (2006.01)
*H02K 21/24* (2006.01)
*B42D 25/29* (2014.01)

(52) U.S. Cl.
CPC .............. *B42D 25/41* (2014.10); *H01F 41/16* (2013.01); *H02K 5/173* (2013.01); *H02K 21/24* (2013.01); *B42D 25/29* (2014.10)

(58) Field of Classification Search
CPC .......... B42D 25/29; B41M 3/14; H01F 41/16; C01G 53/00
USPC .......................................... 427/550, 547, 598
See application file for complete search history.

(56) References Cited

U.S. PATENT DOCUMENTS

| | | |
|---|---|---|
| 3,791,864 A | 2/1974 | Steingroever |
| 5,364,689 A | 11/1994 | Kashiwagi et al. |
| 5,630,877 A | 5/1997 | Kashiwagi et al. |
| 5,671,671 A | 9/1997 | Wyssmann et al. |
| 2007/0172261 A1 | 7/2007 | Raksha et al. |

FOREIGN PATENT DOCUMENTS

| | | |
|---|---|---|
| EP | 0710508 | 5/1996 |
| EP | 2161816 | 5/1996 |
| EP | 0723864 | 7/1996 |
| EP | 0556449 | 3/1997 |
| EP | 1810756 | 7/2007 |
| EP | 1961559 | 8/2008 |
| EP | 2024451 | 9/2009 |
| EP | 2433798 | 3/2012 |
| WO | 199729912 | 8/1997 |
| WO | 2002090002 | 11/2002 |
| WO | 2004007095 | 1/2004 |
| WO | 2004007096 | 1/2004 |
| WO | 2004096545 | 11/2004 |
| WO | 2005002866 | 1/2005 |
| WO | 2005095109 | 10/2005 |
| WO | 2008046702 | 4/2008 |
| WO | 2008102303 | 8/2008 |
| WO | 2010058026 | 5/2010 |
| WO | 2010066838 | 6/2010 |
| WO | 2012038531 | 3/2012 |
| WO | 2015082344 | 6/2015 |
| WO | 2016/026896 | * 2/2016 |
| WO | 2016026896 | 2/2016 |

OTHER PUBLICATIONS

E. Climent et al. (Dynamics of self-assembled chaining in magnetorheological fluids, Langmuir, 2004, 20, p. 507-513).
International Search Report and Written Opinion issued with respect to application No. PCT/EP2018/051084.
International Preliminary Report on Patentability issued with respect to application No. PCT/EP2018/051084.

* cited by examiner

APPARATUSES AND METHODS FOR PRODUCING OPTICAL EFFECT LAYERS

FIELD OF THE INVENTION

The present invention relates to the field of the protection of value documents and value commercial goods against counterfeit and illegal reproduction. In particular, the present invention relates to apparatuses comprising a spinning permanent magnet assembly magnets for use in conjunction with printing or coating equipments, for orienting magnetic or magnetizable pigment particles in a wet and not yet hardened coating or layer on a substrate, as well as to methods for producing optical effect layers (OEL).

BACKGROUND OF THE INVENTION

It is known in the art to use inks, coating compositions, coatings, or layers, containing magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in specific optical effects, useful for the protection of security documents, have been disclosed in WO 2002/090002 A2 and WO 2005/002866 A1.

Security features, e.g. for security documents, can generally be classified into "covert" security features and "overt" security features. The protection provided by "covert" security features relies on the concept that such features require specialized equipment and knowledge for detection, whereas "overt" security features rely on the concept of being detectable with the unaided human senses, e.g. such features may be visible and/or detectable via the tactile senses while still being difficult to produce and/or to copy. However, the effectiveness of overt security features depends to a great extent on their recognition as a security feature, because users will only then actually perform a security check based on said security feature if they have actual knowledge of its existence and nature.

Magnetic or magnetizable pigment particles in printing inks or coatings allow for the production of optical effect layers (OEL), comprising a magnetically induced image, design or pattern which is obtained through the application of a structured magnetic field, causing a local orientation of the magnetic or magnetizable pigment particles in the not yet hardened coating, followed by hardening the coating. The result is a permanently fixed magnetically induced image, design or pattern. Materials and technologies for the orientation of magnetic or magnetizable pigment particles in coating compositions by applying external magnetic fields as can be produced with external permanent magnets or energized electromagnets have been disclosed in U.S. Pat. Nos. 3,676,273; 3,791,864; EP 406,667 B1; EP 556,449 B1; EP 710,508 A1; WO 2004/007095 A2; WO 2004/007096 A2; WO 2005/002866 A1; as well as in WO 2008/046702 A1 and other documents; therein the applied external magnetic field remains essentially static with respect to the OEL during the orientation step. In such a way, magnetically induced images, designs and patterns which are highly resistant to counterfeit can be produced. Such security elements can only be produced by someone having access to both, the magnetic or magnetizable pigment particles or the corresponding ink, and the particular technology employed to print said ink and to orient said pigment in the printed ink.

The magnetic orientation patterns obtained or obtainable with static magnetic fields can be approximately predicted from the geometry of the magnet arrangement, through a simulation of the three-dimensional magnetic field line pattern.

By applying an external magnetic field, a magnetic pigment particle is oriented such that its magnetic axis is aligned with the direction of the external magnetic field line at the location of the pigment particle. A magnetizable pigment particle is oriented by the external magnetic field such that the direction of its longest dimension is aligned with a magnetic field line at the location of the pigment particle. Once the magnetic or magnetizable pigment particles are aligned, the coating composition is hardened, and the aligned magnetic or magnetizable pigment particles are herewith fixed in their positions and orientations.

Highly useful, dynamic and aesthetically appealing security features based on magnetically induced images, designs or patterns providing the optical illusion of movement can be obtained by a dynamic interaction of a time-dependent direction-varying external magnetic field with magnetic or magnetizable pigment particles in an unhardened coating composition. In this process the magnetic or magnetizable pigment particle adopts a position and an orientation of lowest hydrodynamic resistance when interacting with the surrounding medium. A detailed description of the involved mechanism was given by J. H. E. Promislow et al. (Aggregation kinetics of paramagnetic colloidal particles, J. Chem. Phys., 1995, 102, p. 5492-5498) and by E. Climent et al. (Dynamics of self-assembled chaining in magnetorheological fluids, Langmuir, 2004, 20, p. 507-513).

With the aim of producing coatings or layers comprising dynamically oriented magnetic or magnetizable pigment particles, methods for generating time-dependent, direction-variable magnetic fields of sufficient intensity have been developed.

US 2007/0172261 A1 now U.S. Pat. No. 7,934,451 discloses a magnetic orienting device comprising spinning magnets driven by gears and shafts disposed within the body of a rotating cylinder of a printing or coating equipment. However, US 2007/0172261 now U.S. Pat. No. 7,934,451 is silent on the type of motor or driving means necessary to set the magnets into rotation.

CN 102529326 A discloses a magnetic orientating device comprising a driving device and a magnet, the driving device driving the magnet to rotate around a rotation shaft and the magnetic field produced by the rotating magnet being used for magnetically orienting magnetic or magnetizable pigment particles in an ink printed on a substrate, such as to form a magnetically oriented pattern having a three-dimensional appearance. The disclosed drive device is designed for a belt-driven flatbed (FB) printing unit in a discontinuous printing process.

To overcome the drawbacks of the prior art, WO 2016/026896 A1 provided apparatuses and methods for producing optical effect layers, wherein spinning magnets driven by brushless direct current (BLDC) motors are used in conjunction a with printing or coating equipment. WO 2016/026896 discloses in FIG. 1 a motor with both stator and rotor being comprised in a holder and discloses in FIG. 2 a motor with the stator being comprised in the holder and with the rotor being comprised in an exchangeable magnet block. In particular, the motor of Example 2 and FIG. 2 of WO 2016/026896 comprise a quadrupole winding in the stator and a quadrupole permanent magnet arrangement in the rotor and is driven by a 2-phase sequence using a Diodes Inc. AH2984 Hall-effect fan motor controller. Accordingly, said motor is free-running and does not allow for motor speed control. Moreover, the stator quadrupole winding of the said motor is simply disposed on top of an iron plate acting as a pole piece, which implies a relatively large magnetic gap between the stator pole piece and the rotor magnets, which are spaced apart by the stator winding. Correspondingly, the magnetic coupling, generating the mechanical torque, is weak, hence requiring a high operating current.

There still remains a need for a modular, easily replaceable but yet electrically efficient apparatus that fits into an existing rotating magnetic orienting cylinder of an industrial printing machine or coating equipment, or into a flatbed (FB) magnetic orienting printing unit, and which is capable of generating a variety of customized rotating magnetic fields of desired shape so as to provide optical effects through the magnetic orientation of pigment particles in a coating by time-dependent, direction-varying magnetic fields.

SUMMARY OF THE INVENTION

Accordingly, it is an object of the present invention to overcome the deficiencies of the prior art as discussed above. With reference to FIGS. 1 and 5 and 6, an apparatus according to the present invention for the generation of time-dependent, direction-varying magnetic fields comprises a stator and a rotor facing each other through a magnetic gap. The stator comprises a stator core made of a magnetic-field-guiding material and comprising a number n of annular slots which are arranged in a circle. These n annular slots carry n magnet-wire coils which are electrically connected together to constitute a stator winding. The stator has a central mounting hole serving the purpose of fixing said stator onto a support. The rotor carries m alternating permanent-magnetic poles which are arranged in a circle. The rotor is magnetically coupled to the stator via the magnetic gap (G) and is set into movement by addressing the stator winding with a polyphase electric current. The movement is transmitted from the rotor via a hub or protrusion having a hole to a permanent magnet assembly (PMA), serving for the generation of the time-dependent, direction-varying magnetic field. The apparatus described herein provides a strong magnetic coupling between the stator and the rotor, and thus an efficient operation of the apparatus. In the context of the present invention, this is achieved by keeping the magnetic gap (G) between the stator and the rotor as small as possible, and by using structural elements that do not exert a shielding effect onto static or dynamic magnetic fields. These and further aims are achieved by the structural characteristics of the apparatus described herein and exemplified in the embodiments and the Example.

In a first aspect of the present invention, and as depicted in FIGS. 1, 5 and 6, there is provided an apparatus for producing an optical effect layer (OEL) comprising:
a) a first block (A) comprising a1) a holder (1a) having mounted thereto a stator comprising n magnet-wire coils (1b) disposed in n annular slots arranged in a circle around the axis of a magnetic-field-guiding stator core (1c); and
b) a second block (B) comprising:
  b1) a casing (4);
  b2) a rotor comprising m permanent magnet poles (3a) of alternating polarity arranged around a circle in or on one side of a rotor disc (3b), wherein said m permanent magnet poles (3a) face a rotor protection plate (2);
  b3) a rotor protection plate (2), preferably a titanium rotor protection plate (2), wherein said rotor protection plate (2) covers the rotor (3a+3b);
  b3) and
  b4) a permanent magnet assembly (PMA) (5) driven by the rotor, wherein said permanent magnet assembly (PMA) (5) is disposed on the opposite side of the rotor disc (3b), wherein the stator (1b+1c) and the rotor (3a+3b) act together as a brushless DC (BLDC) motor,
wherein n is a multiple of 3 and m is a multiple of 2, provided that n/m is 3/2, 3/4, 6/4, 6/8, 9/8, 9/10, 12/10 or 12/14
wherein the first block (A) is configured to be removeably fixed to a base of a rotating magnetic orienting cylinder (RMC) or a flatbed (FB) magnetic orienting printing unit, and wherein the second block (B) is removeably fixed to the first block (A).

The apparatus described herein constitutes a BLDC motor, comprising the rotor (3a+3b) described herein and the stator (1b+1c) described herein, wherein the rotor is disposed within the casing (4) and the stator is located external to the casing (4) and is magnetically coupled to the rotor to induce its rotation when the stator winding is addressed with appropriate polyphase current. The BLDC motor comprises the rotor (3a+3b) and the stator (1b+1c) facing each other through a magnetic gap (G), where in between torque is generated. The coupling between the stator and the rotor is assured by the interpenetrating magnetic fields of the stator and the rotor and the torque-generating mechanism is the rotating magnetic field of the stator, which drives the m permanent magnet poles (3a) of the rotor.

The second block (B) comprising the casing (4), the rotor protection plate (2), the rotor and the permanent magnet assembly (PMA) (5), in particular the casing (4), is configured to be removeably fixed to the first block (A). The second block (B) is removeable from the first block (A) as a first module, and the first block (A) as another second module. This allows for a convenient replacement of the second block (B) comprising the casing (4) and rotating parts of the apparatus, which may be liable or prone to failure and thus need replacement.

It is desirable to easily change the second block (B) comprising the casing (4) and the rotating parts, in particular the permanent magnet assembly (PMA) (5), to produce alternative optical effect layers (OEL). Accordingly, the second block (B) is removable from the first block (A) to allow for its replacement with an alternative block (B') that is removeably fixed to the first block (A) in the same way. The block (B') also has an alternative permanent magnet assembly (PMA) (5') configured to be driven therein by the BLDC motor.

Additionally, the first block (A), i.e. the holder (1a) and the n magnet-wire coils (1b) in the magnetic-field-guiding stator core (1c) mounted thereto, may be removed as a single block or module from the rotating magnetic orienting cylinder (RMC) or flatbed (FB) magnetic orienting printing unit and may be replaced by an alternative first block (A') that can be removeably fixed to the base of a rotating magnetic orienting cylinder (RMC) or a flatbed (FB) magnetic orienting printing unit in the same way.

The apparatus for producing the optical effect layer described herein may further comprise a winding protection plate (7), preferably a titanium winding protection plate (7), wherein said winding protection plate (7) is comprised in the first block (A) and is disposed on top of the n magnet-wire coils (1b) described herein such as to protect said n magnet-wire coils (1b) from contamination and mechanical damage. The use of a titanium winding protection plate (7) in the magnetic gap (G) has the advantage of conferring mechanical resistance with minimal thickness, keeping the magnetic gap (G) as small as possible, whilst being transparent to static and dynamic magnetic fields.

The apparatus for producing the optical effect layer described herein may further comprise a magnet support (6), wherein said magnet support (6) may be a disc-shaped magnet support made for example of aluminum. Said magnet support (6) is comprised in the second block (B) and carries the permanent magnet assembly (PMA) (5).

The apparatus for producing the optical effect layer described herein may further comprise a bearing (3c). Said bearing (3c) is disposed in the second block (B), is used in connection with the rotor disc (3b) and facilitates the rotation of the rotor disc (3b).

The apparatus for producing the optical effect layer described herein may further comprise a lid (8) to protect the permanent magnet assembly (PMA) (5) from contamination and mechanical damage and to provide a smooth surface for supporting a substrate carrying a coating composition comprising magnetic or magnetizable pigment particles. A further function of the lid (8) is to provide an appropriate distance between the permanent magnet assembly (PMA) (5) and the substrate in contact with the lid (8).

The apparatuses described herein are configured for aggregately orienting magnetic or magnetizable pigment particles in a coating on a substrate by way of a time-dependent, direction-varying magnetic field, produced by a spinning permanent magnet assembly (PMA) (5), thereby producing an optical effect layer (OEL).

In a second aspect of the present invention, there is provided a system comprising one or more of the apparatuses described herein and the rotating magnetic orienting cylinder (RMC) or the flatbed (FB) magnetic orienting printing unit described herein, wherein said one or more apparatuses are mounted thereto through the first block (A). The rotating magnetic orienting cylinder (RMC) or the flatbed (FB) magnetic orienting printing unit described herein supplies the one or more apparatuses with electric current and optionally operation control signals through appropriate connectors.

According to one embodiment, there is provided a rotating magnetic orienting cylinder (RMC) comprising the one or more apparatuses described herein mounted to circumferential grooves of the rotating magnetic orienting cylinder (RMC) through the removable first block (A). The rotating magnetic orienting cylinder (RMC) is aimed to be used in, or in conjunction with, or being part of a printing or coating equipment bearing the one or more apparatuses aimed at generating time-dependent, direction-varying magnetic fields, said rotating magnetic orienting cylinder (RMC) serving to aggregately orient magnetic or magnetizable particles comprised in a coating or layer. In an embodiment of the second aspect, the rotating magnetic orienting cylinder (RMC) is part of a rotary, sheet-fed or web-fed industrial printing press that operates at high printing speed in a continuous way.

According to another embodiment, there is provided a flatbed (FB) magnetic orienting printing unit comprising one or more apparatuses described herein mounted to one or more recesses of the flatbed (FB) printing unit through the removable first block (A). The flatbed (FB) printing unit is aimed to be used in, or in conjunction with, or being part of a printing or coating equipment bearing the one or more apparatuses described herein, aimed at generating time-dependent, direction-varying magnetic fields to aggregately orient the magnetic or magnetizable particles of the coating or layer made of the coating composition described herein. In a preferred embodiment, the flatbed (FB) printing unit is part of a sheet-fed industrial printing press that operates in a discontinuous way.

Also described herein are uses of the apparatus described herein as well as the systems comprising the one or more of apparatuses described herein for producing an optical effect layer (OEL) on a substrate.

Also described herein are methods of making an optical effect layer (OEL) on a substrate, preferably a security document or article, the method comprising:
i) providing a substrate carrying a wet coating or layer comprising magnetic or magnetizable pigment particles;
ii) providing the apparatus described herein, or providing the rotating magnetic orienting cylinder (RMC) or the flatbed (FB) magnetic orienting printing unit described herein and comprising one or more of the apparatuses described herein;
iii) exposing the wet coating or layer comprising the magnetic or magnetizable pigment particles to a time-dependent, direction-varying magnetic field produced by spinning the permanent magnet assembly (PMA) (5) described herein through the combined action of the rotor (3a+3b) described herein and the stator (1b+1c) described herein, to orient at least part of the magnetic or magnetizable pigment particles; and
iv) at least partially hardening the coating or layer comprising the magnetic or magnetizable pigment particles such as to fix at least part of the magnetic or magnetizable pigment particles in a substantially oriented state or oriented state.

Also disclosed herein are methods of modifying an existing rotating magnetic orienting cylinder (RMC) or a flatbed (FB) magnetic orienting printing unit having one or more blocks comprising a fixed or a spinneable permanent magnet assembly, the method comprising removing the one or more blocks comprising a fixed or a spinneable permanent magnet assembly from the rotating cylinder (RMC) or flatbed (FB) magnetic orienting printing unit and replacing them with one or more of the second blocks (B) described herein comprising the casing (4), the rotor protection plate (2), the rotor (3a+3b) and the permanent magnet assembly (PMA) (5) described herein.

Also described herein are methods for producing or protecting a security document, such as a banknote, comprising the steps of:
i) applying the coating composition comprising magnetic or magnetizable pigment particles to the substrate described herein or to the security document described herein so as to form a wet coating or a layer comprising said magnetic or magnetizable pigment particles;
ii) exposing the wet coating or layer to a time-dependent, direction-varying magnetic field produced by spinning the permanent magnet assembly (PMA) (5) through the combined action of the rotor (3a+3b) described herein and the stator (1b+1c) described herein to orient at least part of the magnetic or magnetizable pigment particles;
iii) at least partially hardening the coating or layer comprising magnetic or magnetizable pigment particles so as to fix at least part of the magnetic or magnetizable pigment particles in a substantially oriented state or oriented state.

The present invention advantageously provides an efficient apparatus or system providing time-dependent, direction-varying magnetic fields for producing an optical effect layer, wherein said apparatus comprises a) a first block (A) comprising the stator comprising a winding of electrically interconnected magnet-wire coils (1b) in circularly disposed annular slots of a magnetic-field-guiding stator core (1c), and the corresponding driving electronics, but lacking moving or rotating parts, said stator (1b+1c) being lodged in the first block (A) on the magnetic orienting printing unit which supplies it with electric current and optional operation control signals through appropriate connectors, and b) the rotor (3a+3b) without electric parts but comprising moving magnetic parts, in particular a spinning permanent magnet assembly (PMA) (5) specific to the printing job, which is lodged in an exchangeable second block (B) removeably fixed to said first block (A). Hence, the present invention attributes the electric and static parts of the driving mechanism of the magnetic orienting printing unit to a first unit remaining with said magnetic orienting printing unit, and the rotating or otherwise moving magnetic parts of the apparatus, which are more subject to wear, and which are specific to each printing job, to a second, easily exchangeable unit, removeably attached to said first unit. Both units together form the driving mechanism for driving magnets to create time-dependent, direction-varying structured magnetic fields for the production of OELs.

DETAILED DESCRIPTION

Definitions

Figure 1:
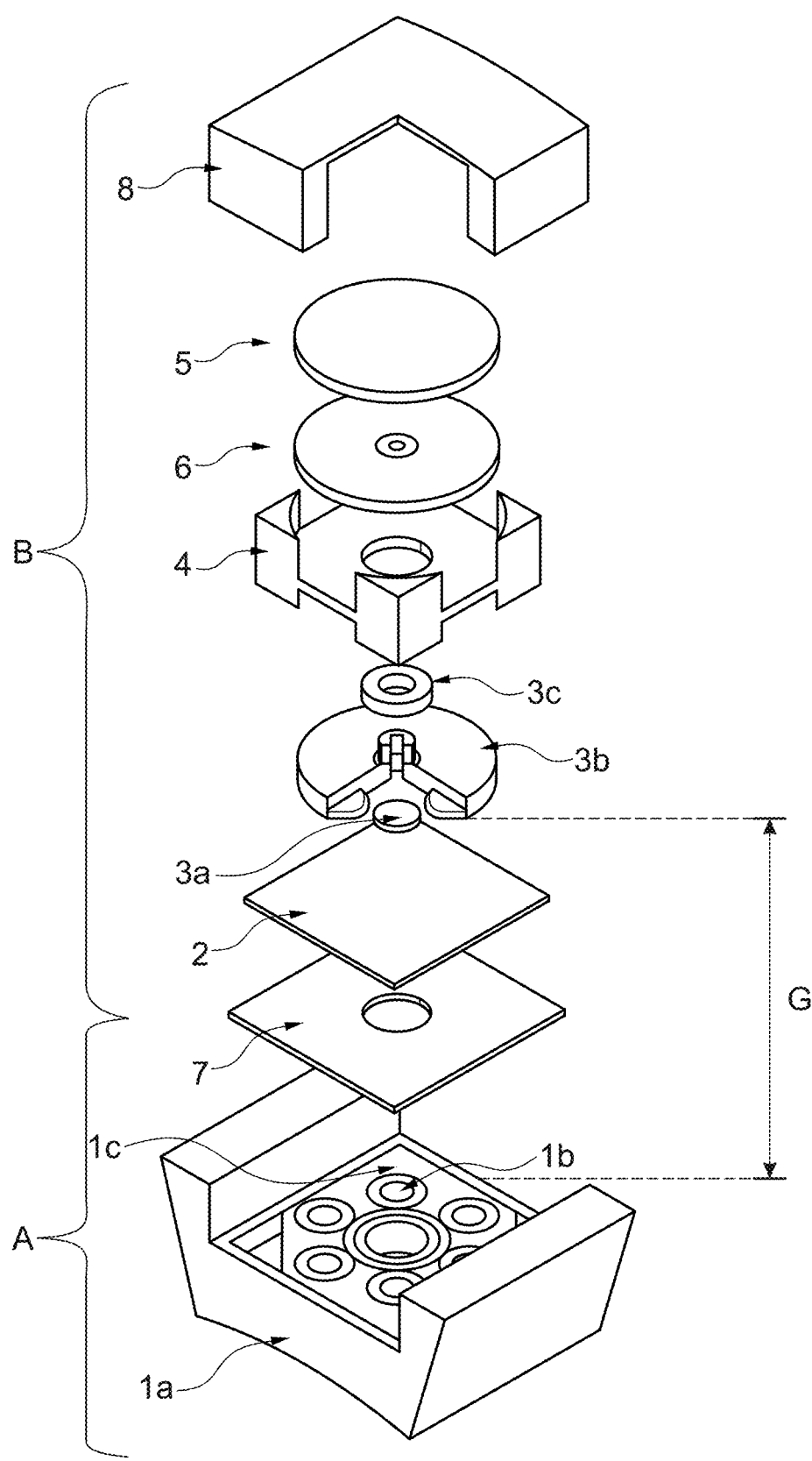
FIG. 1 schematically illustrates an exploded view of an apparatus according to the present invention, said apparatus comprising a) a first block (A) comprising a1) a holder (1a) having mounted thereto a stator comprising a winding of n magnet-wire coils (1b) in circularly disposed annular slots of a magnetic-field-guiding stator core (1c) and comprising a winding protection plate (7) on top of the n magnet-wire coils (1b); and b) a second block (B) comprising a "H"-shaped casing (4), a rotor protection plate (2), a rotor comprising a hub or protrusion with a threaded hole and m permanent-magnetic poles (3a) in a rotor disc (3b) and facing the rotor protection plate (2), a bearing (3c), a disc-shaped magnet support (6) disposed on top of the rotor hub or protrusion (3b), and a permanent magnet assembly (PMA) (5) disposed on top of the disc-shaped magnet support (6). The apparatus is closed with a fixed lid (8). The rotor (3a+3b) and the stator (1b+1c) face each other through a magnetic gap (G).

The following definitions clarify the meaning of the terms used in the description and in the claims.

As used herein, the indefinite article "a" indicates one as well as more than one and does not necessarily limit its referent noun to the singular.

As used herein, the term "about" means that the amount, value or limit in question may be the specific value designated or some other value in its neighborhood. Generally, the term "about" denoting a certain value is intended to denote a range within ±5% of the value. For example, the phrase "about 100" denotes a range of 100±5, i.e. the range from 95 to 105. Generally, when the term "about" is used, it can be expected that similar results or effects according to the invention can be obtained within a range of ±5% of the indicated value. However, a specific amount, value or limit supplemented with the term "about" is intended herein to disclose as well the very amount, value or limit as such, i.e. without the "about" supplement.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a coating composition comprising a compound A" may also (essentially) consist of the compound A.

The term "aggregately" is used to indicate that, upon the influence of an external magnetic field, a sufficient number of magnetic or magnetizable pigment particles of the wet and not yet hardened composition are oriented along a field line at the same time in order to establish a visual effect. Preferably, this sufficient number is around 1000 or more pigment particles being oriented along said field line at the same time. More preferably, this sufficient number is around 10000 or more pigment particles being oriented along said field line at the same time.

As used herein, the term "wet coating" means an applied coating, which is not yet hardened, for example a coating in which the contained magnetic or magnetizable pigment particles are still able to change their positions and orientations under the influence of external forces acting upon them.

The term "coating composition" refers to any composition which is capable of forming a coating or layer, such as an optical effect layer on a solid substrate and which can be applied e.g. by a printing method.

The term "optical effect layer (OEL)" as used herein denotes a layer that comprises oriented magnetic or magnetizable pigment particles and a binder, wherein the orientation and position of the magnetic or magnetizable pigment particles are oriented by a magnetic field, then subsequently, simultaneously or partially simultaneously fixed in their orientation and position through hardening. The term "optical effect layer" (OEL) refers either to the layer comprising the oriented magnetic or magnetizable pigment particles (i.e. after the orientation step) or to the layer comprising the oriented magnetic or magnetizable pigment particles frozen in their orientation and position (i.e. after the hardening step).

The term "magnetic axis" or "South-North axis" denotes a theoretical line connecting the South and the North pole of a magnet and extending through them. These terms do not include any specific direction. Conversely, the term "South-North direction" and S→N on the figures denote the direction along the magnetic axis from the South pole to the North pole.

The term "spin", "spinning" or "spinneable" refers to the rotation of the spinning permanent magnet assembly (PMA) described herein, regardless of its rotation frequency.

The term "security element" or "security feature" is used to denote an image or graphic element that can be used for authentication purposes. The security element or security feature can be overt and/or covert.

A used herein, the term "rotating magnetic orienting cylinder" (RMC) refers to the part of a high-speed continuous printing press that serves to magnetically orient the magnetic or magnetizable pigment particles, thus producing an optical effect layer (OEL).

As used herein, "stator part" and "stator" may be used indiscriminately to describe the same technical element. This also applies to "rotor part" and "rotor".

DETAILED DESCRIPTION OF THE INVENTION

The present invention concerns particular apparatuses for making OELs with the help of spinning permanent magnet assemblies (PMA) (5). The apparatuses described herein are suitable to be used in, or in conjunction with, or to be part of a printing or coating equipment. In particular the apparatuses described herein may be comprised in a rotating magnetic orienting cylinder (RMC) for orienting magnetic or magnetizable pigment particles in a coating composition applied to a substrate, or in a flatbed (FB) magnetic orienting printing unit with the same aim.

As shown in FIG. 1, the apparatus of the invention comprises the first block (A) comprising the holder (1a) described herein having mounted thereto the stator comprising n magnet-wire coils (1b) disposed in annular slots of the magnetic-field-guiding stator core (1c), wherein said stator (1b+1c) forms a BLDC motor with the rotor (3a+3b) described herein. The first block (A) is configured to be removeably fixed to a base of a rotating magnetic orienting cylinder (RMC) or a flatbed (FB) magnetic orienting printing unit, and is configured to receive the second block (B) comprising the casing (4), the rotor protection plate (2), preferably the titanium rotor protection plate (2), the rotor (3a+3b) making up with the stator for the BLDC motor, and the permanent magnet assembly (PMA) (5) as described herein.

The first block (A) is designed to ensure a quick installing or removing of the apparatus described herein to a rotating magnetic orienting cylinder (RMC), in particular to the circumferential mounting grooves of said rotating magnetic orienting cylinder RMC as described in WO 2008/102303 A2, or to a flatbed (FB) magnetic orienting printing unit, in particular to the mounting recesses of a flatbed (FB) magnetic orienting printing unit, and to allow for the easy exchange of the second block (B) comprising the casing (4), the rotor protection plate (2), preferably the titanium rotor protection plate (2), the rotor (3a+3b) and the permanent magnet assembly (PMA) (5) as described herein.

Figure 5:
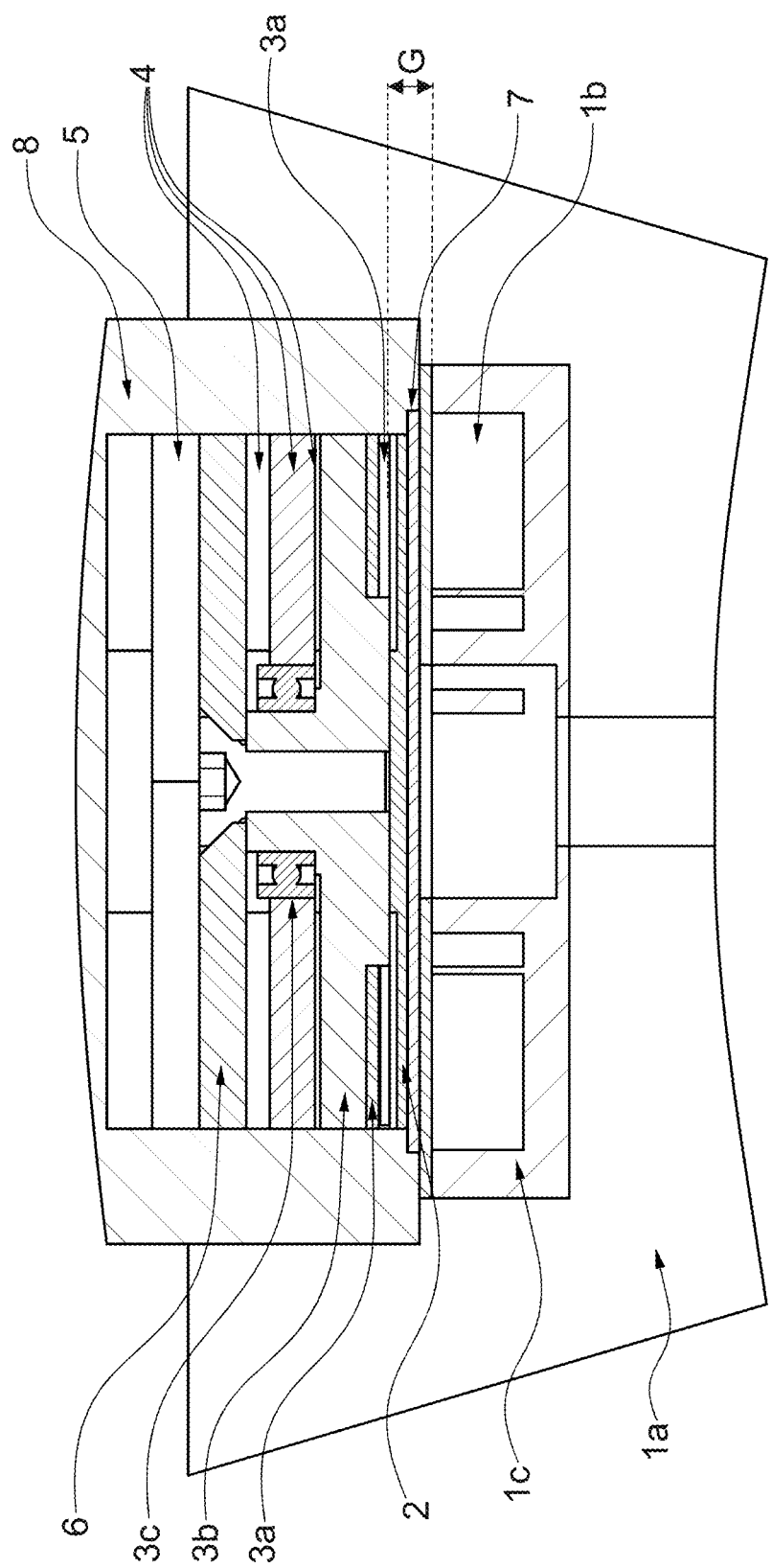
FIG. 5 schematically illustrates a cross-section of the apparatus of FIG. 1, said apparatus comprising a) a first block (A) having mounted thereto a stator comprising a winding of n magnet-wire coils (1b) disposed in annular slots of a magnetic-field-guiding stator core (1c) and comprising a winding protection plate (7) on top of the n magnet-wire coils (1b); and b) a second block (B) comprising a "H"-shaped casing (4), a rotor protection plate (2), a rotor comprising m magnets (3a) in or on a rotor disc (3b) and facing the rotor protection plate (2), a bearing (3c), a disc-shaped magnet support (6) disposed on the hub or protrusion of the rotor disc (3b), and a permanent magnet assembly (PMA) (5) disposed on top of the disc-shaped magnet support (6). The apparatus is closed with a fixed lid (8). The disc-shaped magnet support (6) is fixed to the rotor disc (3b) with a screw (9) through a central threaded hole in its hub or protrusion.
Figure 6:
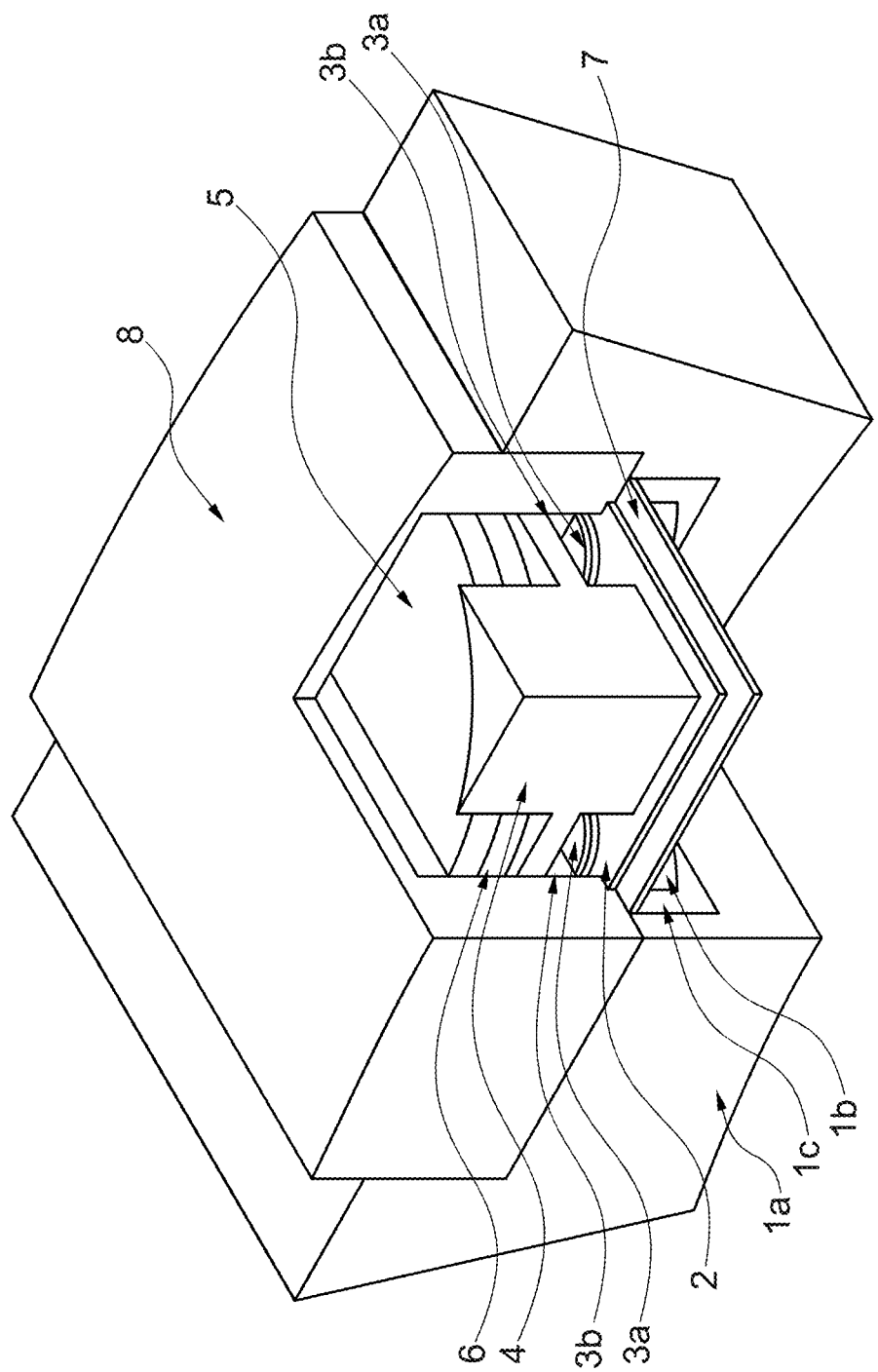
FIG. 6 schematically illustrates an oblique view of the apparatus of FIG. 5.

As shown in FIGS. 5 and 6, the holder (1a) comprises a recess to receive the second block (B) comprising the casing (4), the rotor protection plate (2), preferably the titanium rotor protection plate (2), the rotor (3a+3b), the permanent magnet assembly (PMA) (5), and the optional lid (8), the recess being spatially defined by at least two surrounding sidewalls. Examples are given in FIG. 10 of WO 2008/102303 A2 (four sidewalls), or in FIGS. 12 and 14 (two sidewalls) of WO 2016/026896 A1. Below the recess, the holder (1a) comprises a pocket for receiving the stator (1b+1c). The fixation system of the first block (A) to the rotating magnetic orienting cylinder (RMC) or the flatbed (FB) magnetic orienting printing unit may comprise any form of threaded screw or any other form of mechanical fixation. In one embodiment, the first block (A) may be fixed to the rotating magnetic orienting cylinder (RMC) or the flatbed (FB) magnetic orienting printing unit via a central screw, Allen screw or countersunk bolt. In such a case, the magnetic-field-guiding stator core (1c), mounted to the first block (A) preferably comprises a central hole sufficiently large to give easy access to the fixation system. The diameter of said hole is typically between 5 mm and 8 mm.

In an embodiment, the removeable fixation is such as to hold the second block (B) fixed to the first block (A) along the spinning axis of the permanent magnet assembly (PMA) (5) and in directions perpendicular thereto. That is, the second block (B) is not movable when the removeable fixation is tightened. In an embodiment, the removeable fixation comprises one or more couplers or fasteners that are moveable between a first position in which the second block (B) is fixed to the first block (A) with respect to a spinning axis of the permanent magnet assembly (PMA) (5) and a second position in which the second block (B) is able to be removed from the first block (A) by moving it along the spinning axis of the permanent magnet assembly (PMA) (5). In an embodiment, the apparatus comprises one or more releasable couplers or fasteners for fixing the second block (B) to the first block (A), said fasteners being optionally releasable by operation of a tool, such as a rotatable tool. Alternatively, the fixation of the second block (B) to the first block (A) may comprise threaded screws, latch fasteners or the like. In an embodiment, the fastener is provided as a cam element that is moveable between a locking position in which the second block (B) is secured to the first block (A) and a released position in which the casing (4) is free to be removed from the first block (A). The cam element may be rotated between positions by use of a rotating tool. In another embodiment, bolts that fit in countersinks through the lid (8) of a second block (B) screw into corresponding tapped holes in the first block (A), securely clamping the second block (B) to the first block (A).

If the apparatus of the invention is part of a rotating magnetic orienting cylinder (RMC), the bottom part of the first block (A), in particular the holder (1a) of the first block (A) should be curved according to the curvature radius of the circumferential mounting grooves of the rotating magnetic orienting cylinder (RMC).

Preferably, the holder (1a) is made from one or more non-magnetic materials selected from the group consisting of low conducting materials, non-conducting materials and mixtures thereof, such as for example engineering plastics and polymers, titanium, titanium alloys and austenitic steels (i.e. non-magnetic steels). Engineering plastics and polymers include without limitation polyaryletherketones (PAEK) and its derivatives polyetheretherketones (PEEK), poletherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS. Preferably, holder (1a) is made of one more titanium-based materials since said materials have the advantage of excellent mechanical stability and low electric conductivity. The holder (1a) may also be of aluminum or aluminum alloys which have the advantage of being easily worked, at the expense of exerting some supplementary magnetic breaking force onto the spinning permanent magnet assembly (PMA) (5) due to the generation of eddy-currents.

The stator described herein comprises n magnet-wire coils (1b) disposed in annular slots of the magnetic-field-guiding stator core (1c), as described herein, wherein n is a multiple of 3, making up for a 3-phase motor.

The magnetic-field-guiding stator core (1c) serves to guide and intensify the magnetic flux B generated by the magnetic field H of the n magnet-wire coils (1b), according to the formula $B=\mu*H$, where $\mu$ is the magnetic permeability (expressed in Newton per square Ampere, $N \cdot A^{-2}$) of the material making up the magnetic-field-guiding stator core (1c). The magnetic-field-guiding stator core (1c) is preferably made of one or more magnetizable materials, i.e. materials having high magnetic permeability (expressed as Newton per square Ampere, $N \cdot A^{-2}$) and low coercivity (expressed in Ampere per meter, $A \cdot m^{-1}$) to allow for fast magnetization and demagnetization. The permeability is preferably between about 2 and about 1,000,000, more preferably between about 5 and about 50,000 $N \cdot A^{-2}$ and still more preferably between about 10 and about 10,000 $N \cdot A^{-2}$. The coercivity is typically lower than 1000 $A \cdot m^{-1}$. The magnetic-field-guiding stator core (1c) is preferably made of one or more soft magnetic materials. The one or more soft magnetic materials described herein include without limitation pure iron (from annealed iron and carbonyl iron), nickel, cobalt, soft ferrites like manganese-zinc ferrite or nickel-zinc ferrite, nickel-iron alloys (like permalloy-type materials), cobalt-iron alloys, silicon iron and amorphous metal alloys like Metglas® (iron-boron alloy), preferably pure iron and silicon iron (electrical steel), as well as cobalt-iron and nickel-iron alloys (permalloy-type materials), which all exhibit a high permeability and a low coercivity. More preferably, the magnetic-field-guiding stator core (1c) is preferably an iron core made of soft-magnetic iron (pure iron), which has a good relative permeability $\mu$ of about 5000. The addressing of a full-metal stator with alternating magnetic fields at a certain frequency produces a considerable amount of eddy-current loss due to the conducting iron metal (conductivity $1.00*10^7$ S/m). Lower loss can be achieved by limiting the surface of the individual eddy-current loops by using a composite core of iron powder (e.g. carbonyl iron) in a polymer (plastic) matrix, such as iron-filled polyoxymethylene (POM) or epoxy resin, or an iron-filled tough thermoplastic engineering material like polyphenylene sulfide (PPS).

Figure 3A:
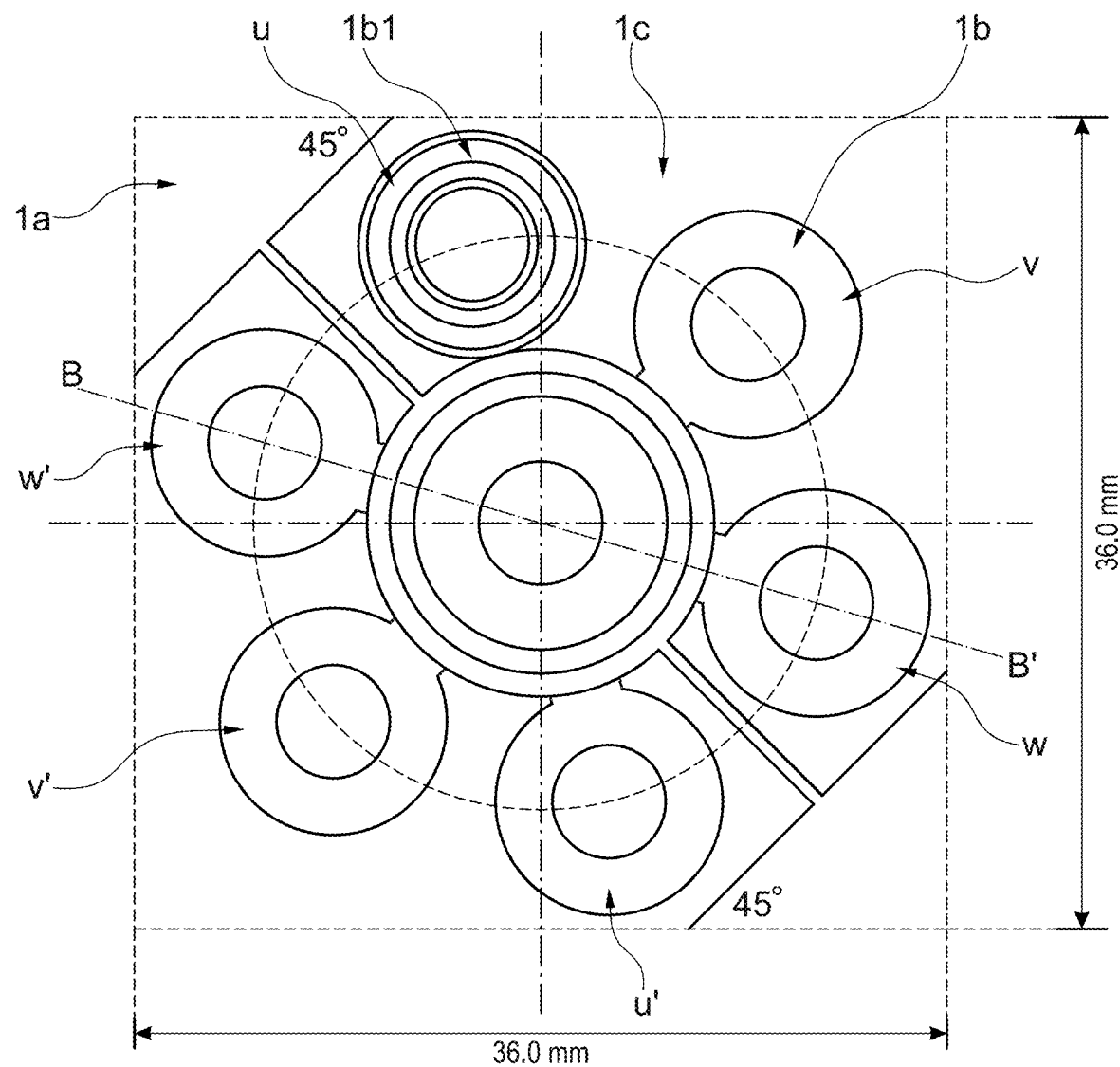
FIG. 3A-B show the technical drawings (3A/top view and 3B/cross-section) of the stator of FIG. 1 and used in the Example, i.e. a stator (1b+1c) having a winding of six magnet-wire coils (1b) disposed in annular slots of a magnetic-field-guiding stator core (1c).
Figure 3B:
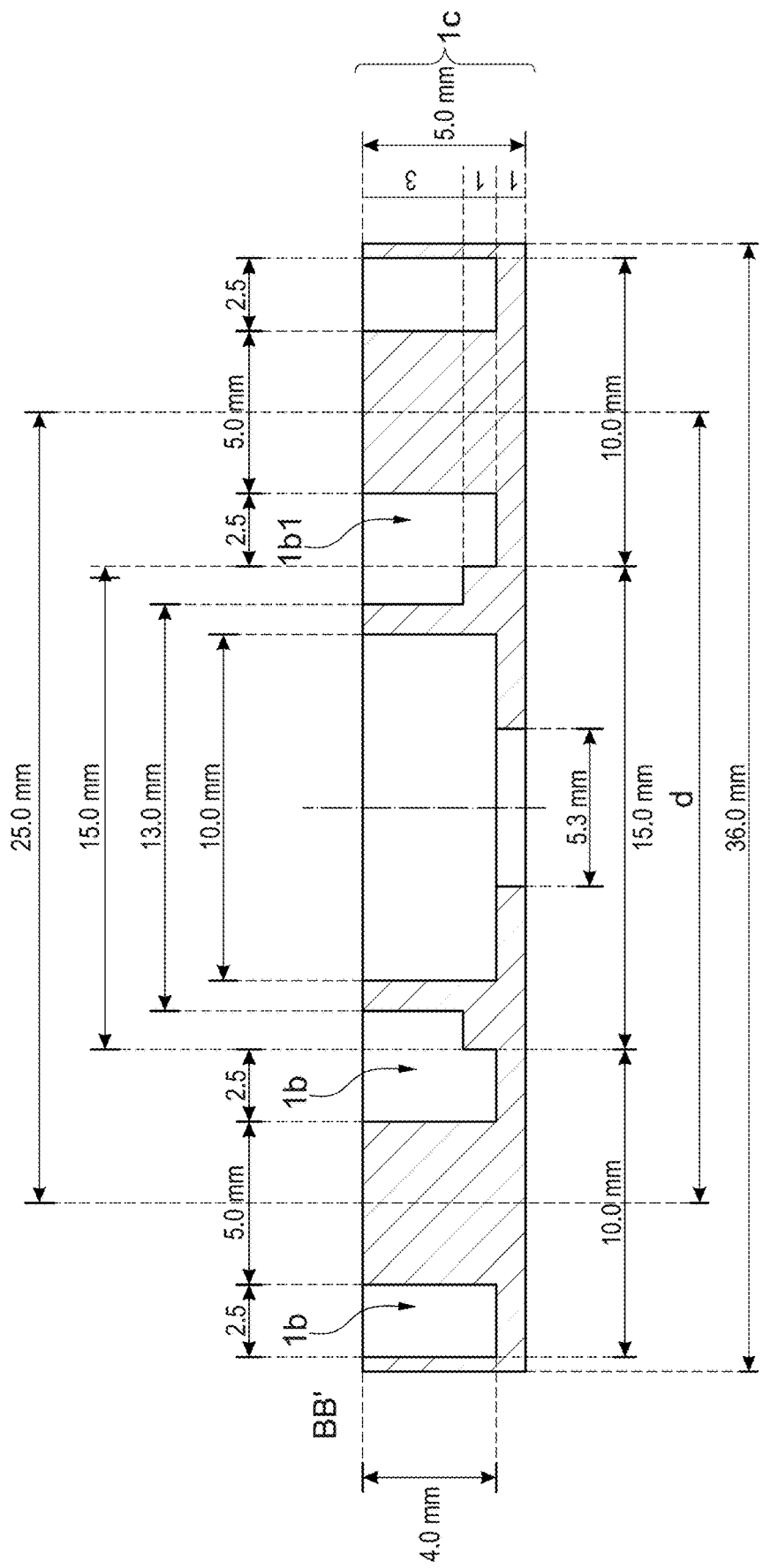
Figure 4A:
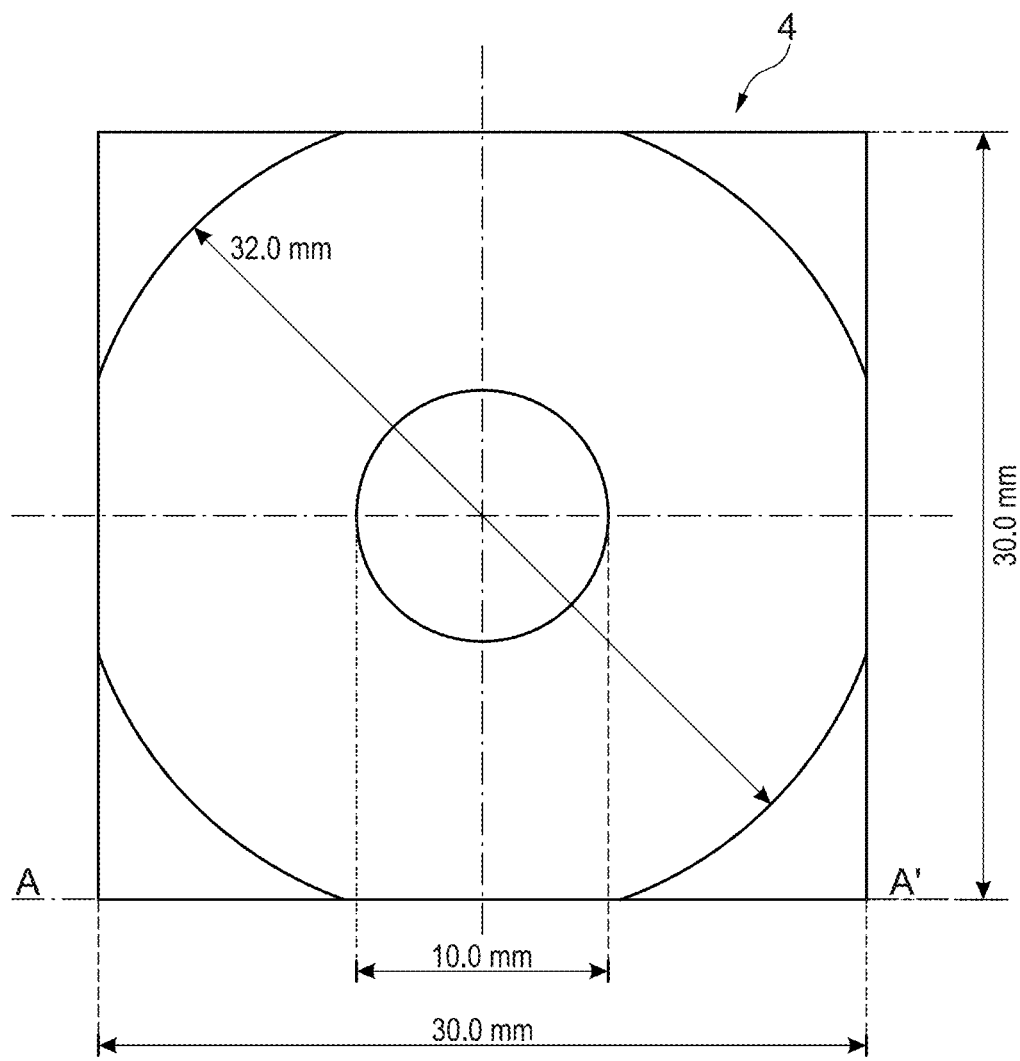
FIG. 4A-B show the technical drawings (4A/top view and 4B/cross-section) of the casing (4) of FIG. 1 and used in the Example.
Figure 4B:
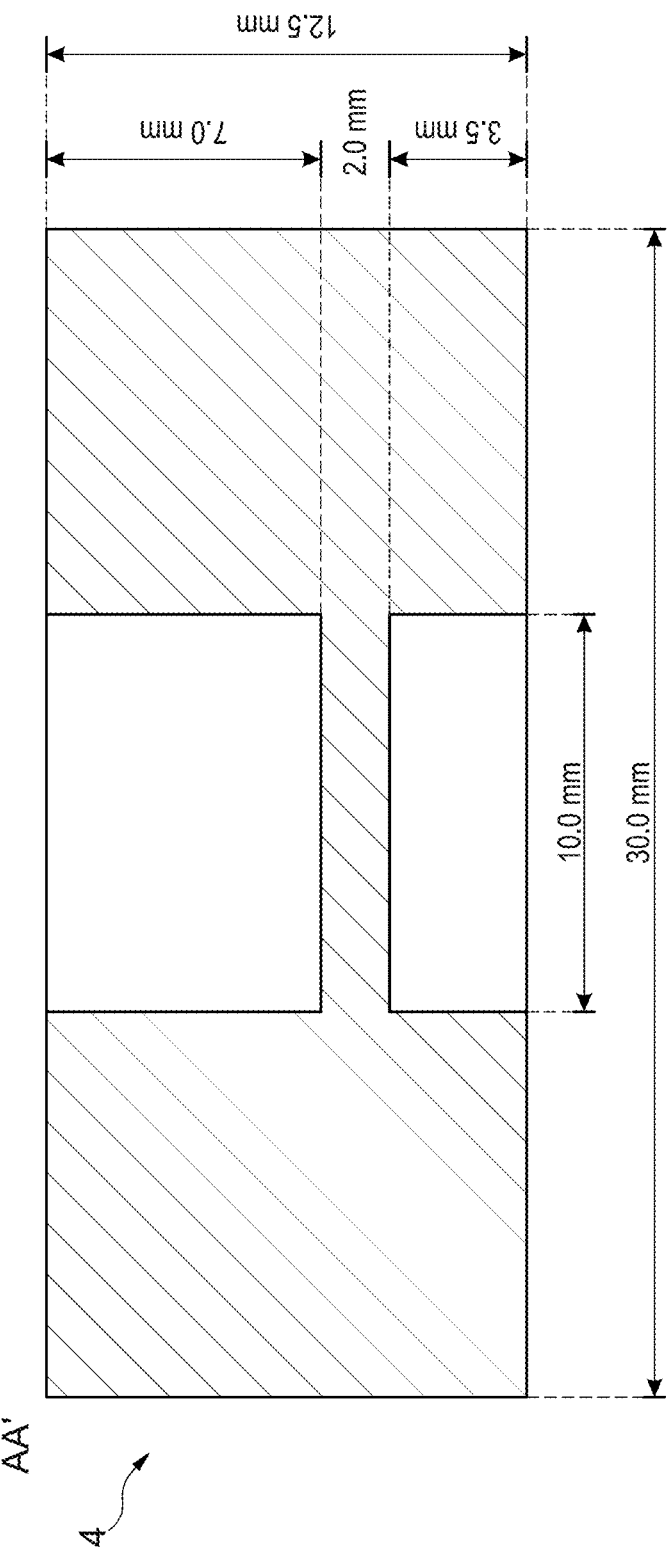

The magnetic-field-guiding stator core (1c), preferably the soft-magnetic iron stator core (1c), described herein is preferably a single-piece magnetic-field-guiding stator core (1c). The magnetic-field-guiding stator core (1c) comprises n circularly arranged annular winding slots. As shown in FIG. 3A-B, the n (n=6 in FIG. 3A-B) magnet-wire coils (1b) are inserted into the annular winding slots and electrically interconnected to form the stator winding. The magnet-wire coils (1b) are typically standard magnet wires having a copper or aluminum core and one or more insulating layers. For clarity purpose in FIG. 3A-B, the magnet-wire coils (1b) have been schematically illustrated in only one (1b1) of the n winding slots (1b).

Preferably, the n magnet-wire coils (1b) described herein are of the "self-bonding" type, which means that the insulating layers are covered with a thermoplastic adhesive layer which can be activated by heat (hot air or oven) or by appropriate solvents. This allows the production of self-standing magnet-wire coils through a simple baking or solvent exposure after their winding onto an appropriate form.

The n magnet-wire coils (1b) are electrically interconnected to form a 3-phase motor circuit of the "star" ("Y") or "delta" type, preferably of the "star" ("Y") type, and connected to a current control unit (CCU). The current control unit (CCU) is preferably disposed close to the stator of the BLDC motor, preferably integrated in the holder (1a) of the first block (A). The current control unit (CCU) refers to an electronic circuit to address the stator winding of a BLDC motor with electric polyphase, preferably 3-phase current in a desired sequence and at a desired speed, as a function of the rotor position.

The n magnet-wire coils (1b) of the stator (1b+1c) are advantageously also used as sensors for the rotor position, eliminating the need for additional Hall sensors and simplifying therewith the electric connection scheme.

According to one embodiment and as shown in FIG. 3A-B, the stator comprises a magnetic-field-guiding stator core (1c), in particular an iron stator core (1c), having n (n=6 in the shown embodiment) circumferentially disposed circular winding slots, into which n (n=6 in the shown embodiment) winding magnet-wire coils (1b) (u, v, w, u', v', w') of enameled copper wire are inserted. In the shown embodiment, each two opposite magnet-wire coils (u, u'), (v, v'), (w, w') are electrically connected together such as to produce the same magnetic polarity at diametrically opposed locations. The resulting three electric circuits (U, V, W) are electrically connected together such as to form a 3-phase Y-scheme. This Y-scheme is preferably electrically connected via 4 wires to a sensorless BLDC motor driver.

The first block (A) comprising the stator with the n magnet-wire coils (1b) and the magnetic-field-guiding stator core (1c), preferably the soft-magnetic iron stator core (1c), may further comprise a winding protection plate (7), wherein said winding protection plate (7) is disposed on top of the stator over the n magnet-wire coils (1b) so as to protect them from contamination and mechanical damage.

The winding protection plate (7) is located in the magnetic gap (G) between the stator (1b+1c) and the rotor (3a+3b) and is preferably made of one or more non-magnetic low conducting material or a non-conducting material such as those described for the holder (1a). Preferably, the winding protection plate (7) is made of titanium, i.e. is a titanium winding protection plate (7), since titanium is neither magnetic, nor magnetizable, has about the mechanical strength of iron, and has a fairly high electric resistance, thus minimizing the eddy-current loss under variable magnetic fields. The winding protection plate (7) may be fixed to the first block (A), in particular the holder (1a), by gluing or by using one or more screws, or by any other fixing means known to the skilled in the art. Preferably, the winding protection plate (7) comprises a central hole sufficiently large to give easy access to the fixation system of the first block (A) to the rotating magnetic orienting cylinder (RMC) or the flatbed (FB) magnetic orienting printing unit. The diameter of said hole is typically 8 mm to 12 mm.

As shown in FIGS. 1, 2, 5 and 6, the apparatus of the invention comprises the rotor (3a+3b) comprising m (m=8 in the shown embodiment) permanent-magnet poles (3a) of alternating polarity in or on one side of the rotor disc (3b) described herein, wherein m is a multiple of 2, wherein said m permanent-magnet poles (3a) face the rotor protection plate (2) described herein and wherein said rotor is part of the BLDC motor, as described herein. The rotor (3a+3b) magnetically interacts with the n magnet-wire coils (1b) through the magnetic gap (G) between the stator (1b+1c) and the rotor (3a+3b). Addressing the stator winding with 3-phase current sets the rotor and the permanent magnet assembly (PMA) (5) into rotation motion and spinning motion.

The m permanent magnet poles (3a) described herein may be embodied as i) m individuals magnets or ii) may consist of a ring-shaped or disc-shaped multipole magnet comprising m poles, such as for example a ring-shaped quadrupole or a ring-shaped octupole magnets.

The m permanent-magnet poles (3a) described herein are for electrical reasons disposed in a mechanically symmetric arrangement with respect to the rotation axis, i.e. making up a regular polygon on a circle. The rotor (3a+3b) and the permanent magnet assembly (5) should also be mechanically balanced when spinning. The m permanent-magnet poles (3a) have substantially axial magnetization directions and alternating magnetic polarity, as well for electrical reasons to allow a smooth rotation of the BLDC motor.

The m permanent-magnet poles (3a) described herein are disposed in a circle with alternating polarity in or on one side of the rotor disc (3b), on its surface facing the rotor protection plate (2), preferably the titanium rotor protection plate (2), and the stator (1b+1c). Preferably, they are embodied by m permanent-magnet poles (3a) mounted, more preferably glued, to said rotor disc (3b). The rotor disc (3b) described herein is preferably made of a magnetic-field-guiding material, preferably a soft magnetic iron or a soft-magnetic iron alloy or a soft-magnetic composite material, such as to guide the magnetic field at the back side of the rotor (i.e. the surface of the rotor opposite to the surface facing the magnet-wire coils (1b)) and to therefore reinforces it at its front side. The rotor disc (3b) made of a soft magnetic material also acts as a magnetic screen between the m permanent magnet poles (3a) and the permanent magnet assembly (PMA) (5). The reinforced magnetic field at the surface of the rotor facing the magnet-wire coils (1b) improves the mechanical torque of the BLDC motor.

The m permanent magnet poles (3a) described herein are independently made of a strong magnetic material. Suitable strong magnetic materials are materials having a maximum value of energy product $(BH)_{max}$ of at least 20 kJ/m$^3$, preferably at least 50 kJ/m$^3$, more preferably at least 100 kJ/m$^3$, even more preferably at least 200 kJ/m$^3$. Preferably the m magnets (3a) described herein are independently NdFeB or SmCo magnets and more preferably NdFeB magnets.

Figure 2A:
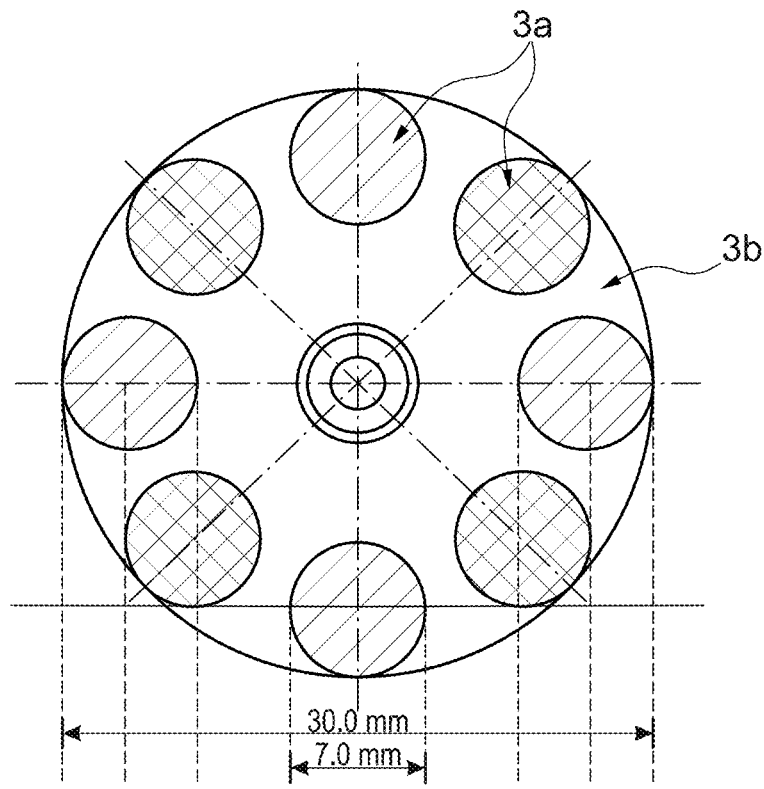
FIG. 2A-B show the technical drawings (2A/bottom view and 2B/cross-section) of the rotor of FIG. 1 and used in the Example, i.e. a rotor comprising eight magnets (3a) of alternating polarity in a rotor disc (3b).

As shown in FIG. 2A, the rotor (3a+3b) comprises a rotor disc (3b), preferably an iron rotor disc (3b), comprising m circularly disposed cavities (m=8 in the shown embodiment) having inserted therein m (m=8 in the shown embodiment) permanent magnet poles (3a), in particular m axially magnetized NdFeB magnet discs, with alternating polarity forming thus an octupole ring-shaped magnet face.

The BLDC motor described herein is preferably a disc-shaped BLDC motor having a high torque-to-weight and size ratio if the magnetic gap (G) between the stator (1b+1c) and the rotor (3a+3b) is small. The stator (1b+1c) described herein comprises the magnetic-field-guiding stator core (1c), preferably the soft-magnetic iron stator core (1c), with three to twelves annular slots carrying magnet-wire coils (1b), the number "n" of magnet-wire coils (1b) being a multiple of 3 for a 3-phase motor. The rotor described herein comprises the rotor disc (3b), preferably the soft-magnetic rotor disc (3b) described herein, with two to fourteen m permanent magnet poles (3a), the number "m" of permanent magnet poles (3a) being a multiple of 2. Combining the stator described herein and the rotor described herein face-to-face, and exciting the stator's 3-phase winding with a 3-phase electric current sets the rotor in spinning motion. As mentioned before, "n" (i.e. the number of slots or magnet-wire coils (1b)) is a multiple of 3 and "m" (i.e. the number of permanent magnet poles (3a)) is a multiple of 2, provided that the combination "n/m" is 3/2; 3/4; 6/4; 6/8; 9/8; 9/10; 12/10 or 12/14 (from http://www.bavaria-direct.co.za/info/).

Figure 2B:
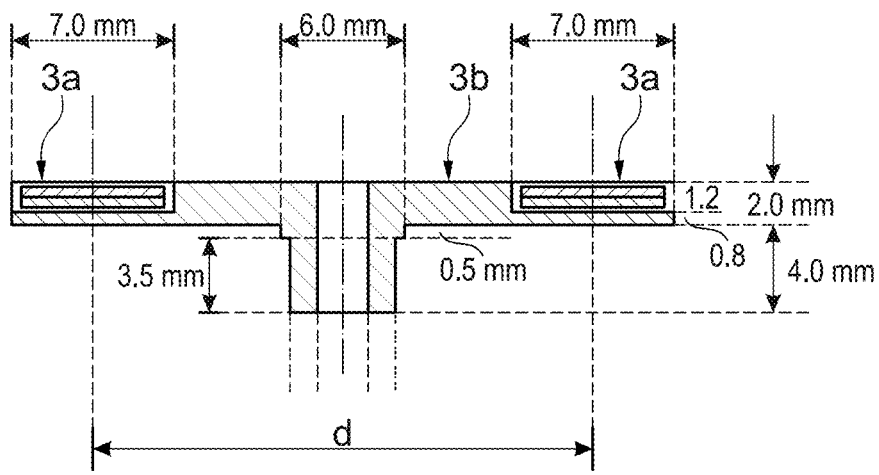

As shown in FIG. 1 and FIG. 2B, a bearing (3c) may be used in connection with the rotor (3a+3b) described herein because said rotor must rotate in magnetic fields and support a considerable axial load from the magnetic attraction between the m permanent magnet poles (3a) and the magnetic-field-guiding stator core (1c), preferably the soft-magnetic iron stator core (1c), as well as support the Coriolis forces when the apparatus described herein for producing the optical effect layer is mounted under operating conditions on a rotating magnetic orienting cylinder (RMC). As shown in FIG. 1 and FIG. 2B, the rotor disc (3b), preferably the soft-magnetic rotor disc (3b), described herein, is preferably configured to accommodate a bearing (3c). Preferably, the rotor disc (3b), preferably the soft-magnetic rotor disc (3b), described herein comprises a hub or protrusion with a threaded hole for supporting the bearing (3c) and transmitting the rotational movement to the spinning permanent magnet assembly (PMA). As shown in FIGS. 1 and 2B, the hub or protrusion preferably raises from the top surface of the rotor disc (3b). The magnetic attraction force between the m permanent magnet poles (3a) of the rotor (3a+3b) and the magnetic-field-guiding stator core (1c), preferably the soft-magnetic iron stator core (1c), keeps the second block (B) firmly in the recess of the holder (1a) of the first block (A), minimizing the width of the magnetic gap (G). Nevertheless, mechanical fixing means are provided as well to removeably secure the second block (B) in the recess of the holder (1a) of the first block (A). These mechanical fixing means may be screws, but preferably, the second block (B) is secured by the means of two cams on both sides of the recess of the holder (1a) of the first block (A).

According to one embodiment, the bearing (3c) described herein is a ball bearing. Preferred materials for the bearing (3c) are those which are non-magnetic and low or non-conducting, in order to avoid or minimize the formation of eddy currents caused by the proximity of the bearing (3c) to the permanent magnet assembly (PMA) (5) and to the rotor. Hybrid metal-ceramic bearings and plastic (including without limitation polyamides (like Nylon®), phenolic resins (like phenol-formaldehyde or Bakelite®), polyacetals (also known as POM, i.e. polyoxymethylenes), polypropylene (PP), polyethylene (PE), perfluorinated polyethylene (like PTFE or Teflon®)) bearings are therefore preferred. Hybrid metal-ceramic bearings are more preferred, since they strike a balance between long-term wearing resistance and low conductivity. Particularly preferred are ceramic ball bearing since these ceramic ball bearings do not develop unipolar induction currents, which break rotary movement and cause electro-erosion. Alternatively a plain bearing, without rolling elements, or preferably a bushing of non-conducting material such as polymer (PE, PP, POM, PTFE, etc.) or of a ceramic material can be used. Advantageously, ceramic ball bearings take up a considerable axial load from the attraction between the rotor and the stator, support the Coriolis forces on the rotating magnetic orienting cylinder (RMC) of a printing machine and well support the optional disc-shaped magnet support (6).

As shown in FIGS. 1, 2 and 5, the rotor disc (3*b*) may comprise a hub or protrusion with a central threaded hole as a fixation system, in particular with the help of a screw (9), so as to solidly fix the rotor disc (3*b*) to the permanent magnet assembly (PMA) and the optional magnet support (6). The threaded hole is typically an M3 thread.

In addition to the rotor (3*a*+3*b*) described herein, the second block (B) described herein further comprises the rotor protection plate (2), preferably the titanium rotor protection plate (2), described herein, wherein said rotor protection plate (2) closes the second block (B) below the m magnets (3*a*) of the rotor such as to protect them from contamination and mechanical damage.

In addition to the rotor (3*a*+3*b*) described herein and the rotor protection plate (2), preferably the titanium rotor protection plate (2), described herein, the second block (B) described herein further comprises the casing (4) described herein which forms the basic framework carrying the rotor and the permanent magnet assembly (PMA). The rotor (3*a*+3*b*) is disposed within the casing (4) and the stator (1*b*+1*c*), is located external to the casing (4) and magnetically coupled to the rotor (3*a*+3*b*) via the magnetic gap (G). The casing (4) described herein is preferably made of one or more non-magnetic low conducting materials or non-conducting materials such as those described for the holder (1*a*). Preferably, the casing (4) is made of titanium which has the advantage of high mechanical resistance, whilst being transparent to static and dynamic magnetic fields.

In a preferred embodiment and as shown in FIGS. 1, 4, 5 and 6, the casing (4) is a "H"-shaped casing (4) comprising a first cavity and a second cavity. In embodiments where the casing (4) is a "H"-shaped casing (4) and as shown in FIGS. 5 and 6, the rotor (3*a*+3*b*) described herein and rotor disc (3*b*) described herein are disposed within the first cavity of the "H"-shaped casing (4). The permanent magnet assembly (5) is disposed within the second cavity of the "H"-shaped casing (4) and faces the environment and faces, through the lid (8) when present, the substrate carrying the coating composition comprising magnetic or magnetizable pigment particles when the apparatus is used for producing the optical effect layer described herein. When an optional magnet support (6) is used, said magnet support (6) is disposed below the permanent magnet assembly (PMA) (5) within the second cavity of the "H"-shaped casing (4). As shown in FIGS. 1, 4, 5 and 6, the "H"-shaped casing (4) may comprise four corner feet for taking up the magnetic attraction force between the stator (1*b*+1*c*) and the rotor (3*a*+3*b*). The "H"-shaped casing (4) may comprise a central hole sufficiently large to take up the optional bearing (3*c*) described herein and to give easy access to a fixation system so as to solidly fix the rotor disc (3*b*) via its hub or protrusion to the permanent magnet assembly (PMA) and the optional magnet support (6). The diameter of said hole depends on the bearing (3*c*) and is typically between 8 mm and 15 mm.

In addition to the rotor (3*a*+3*b*) described herein, the rotor protection plate (2), preferably the titanium rotor protection plate (2), described herein and the casing (4) described herein, the second block (B) described herein further comprises the permanent magnet assembly (PMA) (5) driven by the rotor, wherein said permanent magnet assembly (PMA) (5) is mounted on top of the rotor disc (3*b*), in particular and as shown in FIGS. 1 and 5, on top of the rotor disc (3*b*) hub or protrusion.

As shown in FIGS. 1, 5 and 6, the second block (B) described herein comprises a permanent magnet assembly (PMA) (5) able to produce a magnetic field strong enough to change, upon exposure thereto, the orientation of magnetic or magnetizable pigment particles in a wet and not yet hardened coating or layer comprising magnetic or magnetizable pigment particles on a substrate in contact with the top surface of the second block (B). The permanent magnet assembly (PMA) (5) is chosen and customized according to the end-use applications and the desired orientation of the magnetic or magnetizable pigment particles A large variety of permanent magnet assemblies (PMA) (5), i.e. a large variety of blocks (B), can thus be used with the same stator.

The spinning-permanent magnet assemblies (PMA) (5) described hereabove give access, when integrated into the apparatus of the invention, to optical effects which are not accessible with static permanent magnet assemblies aimed at generating static magnetic fields.

The one or more permanent magnets (M1, M2, M3, . . . Mn) comprised in the spinning permanent magnet assembly (PMA) (5) described herein are preferably made of one or more strong magnetic materials. The one or more permanent magnets generate a sufficiently strong magnetic field to orient the magnetic or magnetizable pigment particles of the wet and not yet coating or layer comprising magnetic or magnetizable pigment particles described herein. Suitable strong magnetic materials are materials having a maximum value of energy product $(BH)_{max}$ of at least 20 kJ/m$^3$, preferably at least 50 kJ/m$^3$, more preferably at least 100 kJ/m$^3$, even more preferably at least 200 kJ/m$^3$.

The one or more permanent magnets (M1, M2, M3, . . . Mn) comprised in the permanent magnet assembly (PMA) are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC(R1- 1-7) and Alnico 9 (R1-1-6); hexaferrites of formula $MFe_{12}O_{19}$, (e.g. strontium hexaferrite ($SrO*6Fe_2O_3$) or barium hexaferrites ($BaO*6Fe_2O_3$)), hard ferrites of the formula $MFe_2O_4$ (e.g. as cobalt ferrite ($CoFe_2O_4$) or magnetite ($Fe_3O_4$)), wherein M is a bivalent metal ion), ceramic 8 (SI-1-5); rare earth magnet materials selected from the group comprising $RECo_5$ (with RE=Sm or Pr), $RE_2TM_{17}$ (with RE=Sm, TM=Fe, Cu, Co, Zr, Hf), $RE_2TM_{14}B$ (with RE=Nd, Pr, Dy, TM=Fe, Co); anisotropic alloys of Fe Cr Co; materials selected from the group of PtCo, MnAlC, RE Cobalt 5/16, RE Cobalt 14.

In addition to the rotor (3*a*+3*b*) described herein, the rotor protection plate (2), preferably the titanium rotor protection plate (2), described herein, the casing (4) and the permanent magnet assembly (PMA) (5) described herein, the second block (B) described herein further comprises the magnet support (6) described herein, wherein said magnet support (6) carries the permanent magnet assembly (PMA) (5). Preferably, the magnet support (6) is a disc-shaped magnet support (6). Suitable materials for the magnetic support (6), preferably the disc-shaped magnet support (6), described herein include without limitation aluminum, titanium, polymers and composites, such as glass fiber epoxy, as well as soft-magnetic iron, iron alloys and composites, if a magnetisable support is desired. The magnetic support (6), preferably the disc-shaped magnet support (6) is made of aluminum or titanium. The magnetic support (6), preferably the disc-shaped magnet support (6), described herein may comprise a central hole so as to allow its fixation to the hub or protrusion of the rotor disc (3b), e.g. via the M3 screw used in the Example.

As shown in FIGS. 1, 5 and 6, the rotor (3a+3b) described herein and the stator (1b+1c) described herein are coaxially arranged. The magnetic gap (G) between said rotor and stator, which is defined by the topmost surface of the magnetic-field-guiding stator core (1c), preferably the soft-magnetic iron stator core (1c), and the lowest surface of the rotor (3a+3b) must be kept as small as possible such as to yield a good interpenetration of the magnetic fields of the stator (1b+1c) and the rotor (3a+3b). Preferably, the magnetic gap (G), is less than ¼ of the diametrical slot-slot-distance (d, see FIG. 3B) of the stator or the diametrical pole-pole-distance (d, see FIG. 2B) of the rotor, more preferably less than ⅙, most preferably less than ⅛ of said distance. For a diametrical slot-slot-distance of 25 mm, as given in the example (FIG. 3B), the magnetic gap is thus preferably less than or equal to about 6 mm, more preferably less than or equal to about 4 mm, and most preferably less than or equal to about 3 mm. The important parameter here is the distance-to-diameter ratio, which governs the dipole-dipole interactions between the stator and the rotor. The distance-to-diameter ratio noteworthy governs the dipole-dipole interactions between stator and rotor, which drop very quickly with increasing distance.

As described herein, the apparatus described herein is configured for aggregately orienting magnetic or magnetizable pigment particles in a coating on a substrate by way of a rotating magnetic field produced by the spinning permanent magnet assembly (PMA) (5) to thereby produce an optical effect layer (OEL). As described herein, the first block (A) comprising the holder (1a) and the stator (1b+1c) described herein is configured to be removeably fixed to a base of a rotating magnetic orienting cylinder (RMC) or a flatbed (FB) magnetic orienting printing unit, and the second block (B) described herein comprising casing (4), the rotor protection plate (2), the rotor (3a+3b) and the permanent magnet assembly (PMA) (5) is removeably fixed to the first block (A).

The apparatus described herein can be built in such a way that the spinning axis of the spinning permanent magnet assembly (PMA) (5) is substantially perpendicular to the substrate surface. A rotating magnetic field of a desired pattern is generated by the spinning permanent magnet assembly (PMA) (5). The rotating magnetic field acts on the magnetic or magnetizable pigment particles dispersed in the wet and not yet hardened coating or layer to aggregately orient the particles so as to produce the desired OEL. Upon the exposure of the magnetic or magnetizable pigment particles to the rotating magnetic field, rotationally symmetric optical effects depending on the configuration of the spinning permanent magnet assembly (PMA) (5) are obtained.

As shown in FIGS. 1, 5 and 6, the apparatus described herein is preferably closed by a non-spinning or fixed lid (8) whose external shape may seamlessly conform to the external surface of the rotating magnetic orienting cylinder (RMC) or of the flatbed (FB) magnetic orienting printing unit wherein said apparatus is fitted. The lid (8) serves as a separating element between the permanent magnet assembly (PMA) (5) and the substrate carrying the coating or layer comprising the magnetic or magnetizable pigment particles, preventing mechanical contact, which might hinder the spinning movement of the permanent magnet assembly (PMA) (5) and/or damage the substrate. Alternatively and when the lid (8) does not have an external shape that seamlessly conforms to the external surface of the rotating magnetic orienting cylinder (RMC) or of the flatbed (FB) magnetic orienting printing unit and as described hereafter, a cover plate may be used. The lid (8) described herein is preferably made of one or more materials selected from the group consisting of engineering plastics and polymers such as those described hereabove for the holder (1a), titanium, titanium alloys and non-magnetic steels. The lid may advantageously further comprise one or more static magnets, in particular an engraved magnetic plate, as disclosed for example in WO 2005/002866 A1 and WO 2008/046702 A1. Such an engraved plate may be made from iron or, alternatively, from a plastic material in which magnetic particles are dispersed (such as for example Plastoferrite). In this way, the OEL produced by the spinning permanent magnet assembly (PMA) (5) can be overlaid with a magnetically induced fine-line pattern, such as a text, an image or a logo.

Depending on the nature of the one or more materials used for the holder (1a), the rotor protection plate (2), the casing (4), the optional magnet support (6) and the optional winding protection plate (7) (i.e. the non-magnetic materials selected from the group consisting of low conducting materials, non-conducting materials and mixtures thereof described herein), said holder (1a), said rotor protection plate (2), said casing (4), said optional magnet support (6) and said optional winding protection plate may be produced by any cutting or engraving methods known in the art including without limitation casting, molding, hand-engraving or ablation tools selected from the group consisting of mechanical ablation tools, gaseous or liquid jet ablation tools, by chemical etching, electro-chemical etching and laser ablation tools (e.g. $CO^{2-}$, Nd-YAG or excimer lasers) or techniques well-known in the art for polymers and plastics including 3D printing, lamination molding, compression molding, resin transfer molding or injection molding may be used. After molding, standard curing procedures may be applied, such as cooling down (when thermoplastic polymers are used) or curing at high or low temperature (when thermosetting polymers are used), or by removing parts of them to get the required design using standard tools to work out plastic parts.

The present invention further provides a system comprising one or more of the apparatuses described herein and the rotating magnetic orienting cylinder (RMC) or the flatbed (FB) magnetic orienting printing unit described herein, wherein said one or more apparatuses are mounted by the means of the first block (A). The stator (1b+1c) described herein or the assembly comprising the stator and the optional winding protection plate (7) disposed on top of the stator described herein is/are inserted in the holder (1a) of the first block (A) in such a way that it is possible to removeably attach to the first block (A) the second block (B) One or more releasable couplers or fasteners for fixing the second block (B) to the first block (A) may be used, said couplers fasteners being optionally releasable by operation of a tool, such as a rotatable tool. Alternatively, the fixation of the one or more second block (B) described herein to the one or more first block (A) described herein may comprise threaded screws, latch fasteners or the like. In an embodiment, the fasteners are provided as cam elements that are moveable between a locking position in which the second block (B) is secured to the first block (A) and a released position in which the casing (4) is free to be removed from the first block (A). The cam elements may be rotated between positions by use of a rotating tool. In another embodiment, bolts that fit in countersinks through the lid (8) of the one or more second blocks (B) screw into corresponding tapped holes in each of the one or more blocks (A), securely clamping each of the one or more second blocks (B) to any one of the one or more blocks (A) comprised in the system.

The first block (A) comprising the holder (1a) having mounted thereto the stator (1b+1c) is accordingly configured to be removeably fixed to a base of a rotating magnetic orienting cylinder (RMC) or a flatbed (FB) magnetic orienting printing unit. first block (A) comprising the holder (1a) having mounted thereto the stator (1b+1c) can thus be easily changed on the rotating magnetic orienting cylinder (RMC) or the flatbed (FB) magnetic orienting printing unit to configure said RMC or FB for producing alternative optical effect layers (OEL).

The removeable fixation of the first block (A) comprising the holder (1a) having mounted thereto the stator (1b+1c) to the base of the rotating magnetic orienting cylinder (RMC) or the flatbed (FB) magnetic orienting printing unit is a releasable coupling, such as a threaded screw. In an embodiment, the apparatus comprises one or more fasteners for removeably fixing the first block (A) to the base.

In one embodiment, the rotating magnetic orienting cylinder (RMC) or the flatbed (FB) magnetic orienting printing unit comprises a plurality, in particular an array, of the apparatuses described herein, each apparatus comprising its first block (A) comprising the holder (1a) having mounted thereto the stator (1b+1c) and its block (B) comprising the casing (4), the rotor protection plate (2), preferably the titanium rotor protection plate (2), the rotor (3a+3b) and the permanent magnet assembly (PMA) (5), in order to produce, at the same time, a plurality, in particular an array, of optical effect layers (OEL), by applying a rotating magnetic field produced by the spinning permanent magnet assembly (PMA) (5) to aggregately orient the magnetic or magnetizable pigment particles.

According to one embodiment, a plurality of the apparatuses described herein, each one comprising its first block (A) and its second block (B) which may be removeably fixed adjacent to one another longitudinally and/or laterally with respect to the printing direction in the mounting recesses of a flatbed (FB) screen printing machine, as described in WO 2010/066838 A1, or in circumferential mounting grooves of a rotating magnetic orienting cylinder (RMC), as described in WO 2008/102303 A2. Each one of the plurality of apparatuses described herein is able to aggregately orient the magnetic or magnetizable pigment particles of the wet and not yet hardened coating or layer comprising the magnetic or magnetizable pigment particles according to the pattern defined by the spinning permanent magnet assembly (PMA) (5) and the optional engraved plate comprised in the lid, thereby creating a plurality of individual OEL's. The individual OEL's will be spaced, but adjacent to one another, along the width and the length of the substrate, according to the spacing and arrangement of the apparatuses described herein.

According to one embodiment, the system described herein comprises the rotating magnetic orienting cylinder (RMC), wherein said the rotating magnetic orienting cylinder (RMC) comprises one or more apparatuses described mounted thereto through the first block (A). The rotating magnetic orienting cylinder (RMC) is arranged such as to convey a substrate carrying a coating or layer comprising magnetic or magnetizable pigment particles and the spinning permanent magnet assembly (PMA) (5) of the apparatus is configured to apply a rotating magnetic field to aggregately orient the magnetic or magnetizable pigment particles of the coating or layer described herein to produce optical effect layers (OEL).

The rotating magnetic orienting cylinder (RMC) comprises a base to which the first block (A) is removeably fixed. The base may be according to that described above, e.g. the base consists of one or more circumferential mounting grooves in the rotating magnetic orienting cylinder (RMC) that fittingly receives the first block (A) and the other components of the apparatus.

In an embodiment of the system comprising the rotating magnetic orienting cylinder (RMC) described herein, the printing unit works according to a rotary, continuous process. In an embodiment of the system comprising a flatbed (FB) magnetic orienting printing unit described herein, the printing unit works according to a longitudinal, discontinuous process.

The spinning frequency of the spinning permanent magnet assembly (PMA) (5) is preferably chosen such that it undergoes at least one complete revolution during the time of exposure of the magnetic or magnetizable pigment particles to the rotating magnetic field. The spinning permanent magnet assembly (PMA) (5) should thus spin at least once through a full revolution to ensure that a rotationally symmetric aggregate orientation of the magnetic or magnetizable pigment particles is produced to result in the desired OEL.

In an embodiment of the system comprising the rotating magnetic orienting cylinder (RMC) described herein, the required spinning frequency is chosen as a function of the printing speed of the printing or coating equipment comprising said rotating magnetic orienting cylinder (RMC), of the position of the hardening device and of the construction of the spinning permanent magnet assembly (PMA) (5). The speed of rotation of the outer periphery of the rotating magnetic orienting cylinder (RMC), and thus the speed of movement of the substrate in the machine direction, and the spinning frequency of the spinning permanent magnet assembly (PMA) (5) are set such that the spinning permanent magnet assembly (PMA) (5) performs at least one complete revolution (360°) while the part of the substrate carrying the coating or layer comprising magnetic or magnetizable pigment particles is in contact with the rotating magnetic orienting cylinder (RMC) and hence exposed to the generated rotating magnetic field. The part of the coating or layer comprising magnetic or magnetizable pigment particles exposed to the rotating magnetic field remains stationary relative to the rotating magnetic orienting cylinder (RMC) to ensure the quality of the OEL. In an embodiment, the spinning permanent magnet assembly (PMA) (5) performs at least one complete revolution (360°) during the application of the rotating magnetic field to the magnetic or magnetizable pigment particles as the spinning permanent magnet assembly (PMA) (5) and the substrate moves in the machine direction at the same speed. For typical industrial printing speeds of at least 8000 sheets per hour, typically 8,000 to 10,000 sheets per hour, i.e. three sheets per second, and a contact time of the sheet with the rotating magnetic orienting cylinder (RMC) of ⅙ of a second the required spinning frequency is preferably at least about 10 Hz, more preferably at least about 25 Hz, and even more preferably at least about 50 Hz.

In an embodiment of the system comprising the flatbed (FB) magnetic orienting printing unit described herein, the required spinning frequency of the spinning permanent magnet assembly (PMA) (5) depends on the printing speed of said flatbed (FB) magnetic orienting printing unit, on the position of the hardening device and on the construction of the permanent magnet assembly (PMA) (5). The spinning frequency of the spinning permanent magnet assembly (PMA) (5) is set such that the spinning permanent magnet assembly (PMA) (5) makes at least one complete revolution while the part of the substrate carrying the coating or layer comprising magnetic or magnetizable pigment particles is on the flatbed (FB) magnetic orienting printing unit comprising the one or more apparatuses of the invention, and hence exposed to the generated rotating magnetic field. For typical industrial printing speeds of 100-300 sheets per hour, the spinning frequency required is preferably at least about 5 Hz, and even more preferably at least about 20 Hz.

The apparatus described herein has a surface to be brought in contact with, or held in appropriate distance to, a substrate surface carrying a wet and not yet hardened coating or layer comprising magnetic or magnetizable pigment particles. Accordingly, the system comprising the rotating magnetic orienting cylinder (RMC) described herein or the flatbed (FB) magnetic orienting printing unit described herein may include a substrate feeder for feeding a substrate having thereon a coating of magnetic or magnetizable pigment particles, so that the spinning permanent magnet assembly (PMA) (5) generates a rotating magnetic field that acts on the pigment particles to orient them aggregately to form an optical effect layer (OEL). The substrate feeder feeds the substrate (under the form of a web or sheets) such as to expose the magnetic or magnetizable pigment particles dispersed in the wet and not yet hardened coating or layer comprising magnetic or magnetizable pigment particles to the rotating magnetic field produced by the spinning permanent magnet assembly (PMA) (5). To this aim, the magnetic or magnetizable pigment particles in the coating or layer on the substrate must be brought to the appropriate place of the rotating structured magnetic field such as to produce the desired OEL. The distance between the spinning permanent magnet assembly (PMA) (5) and the coating or layer comprising magnetic or magnetizable pigment particles is application-dependent and is typically between 0.5 and 10 mm. An optimum way of reproducibly obtaining the appropriate distance is by means of the lid (8) described herein, which maintains the distance from the spinning permanent magnet assembly (PMA) (5) and is itself in contact with the backside of the substrate.

In an embodiment of the system comprising the rotating magnetic orienting cylinder (RMC) described herein, the substrate is fed by the substrate feeder under the form of sheets or a web. The substrate feeder is configured to feed the sheets or web and the rotating magnetic orienting cylinder (RMC) is configured to rotate in such a way that, as long as the portion of the substrate carrying the wet and not yet hardened coating or layer comprising magnetic or magnetizable pigment particles is in contact with the rotating magnetic orienting cylinder (RMC), it is stationary relative to the axis of the spinning permanent magnet assembly (PMA) (5). By the subsequent, partially simultaneous or simultaneous hardening of the coating or layer comprising the oriented magnetic or magnetizable pigment particles, an array of individual OEL's is produced on the sheet or web.

In an embodiment of the system comprising the flatbed (FB) magnetic orienting printing unit described herein, the substrate is fed under the form of sheets.

The system comprising the rotating magnetic orienting cylinder (RMC) described herein or the flatbed (FB) magnetic orienting printing unit described herein may include a printer for applying the coating comprising magnetic or magnetizable pigment particles so as to from a coating or layer comprising said pigment particles on a substrate, that are aggregately oriented by the rotating magnetic field generated by the spinning permanent magnet assembly (PMA) (5) to form an optical effect layer (OEL).

The system comprising the rotating magnetic orienting cylinder (RMC) described herein or the flatbed (FB) magnetic orienting printing unit described herein may include a coating hardener for at least partially hardening a coating or layer comprising the magnetic or magnetizable pigment particles that have been magnetically oriented aggregately by the spinning permanent magnet assembly (PMA) (5), thereby fixing the orientation and position of the magnetic or magnetizable pigment particles to produce an optical effect layer (OEL).

The rotating magnetic orienting cylinder (RMC) comprising one or more apparatuses described herein is part of a rotary, continuous printing press. The coating composition is preferably applied by a printing process preferably selected from the group consisting of screen printing, intaglio printing, rotogravure printing and flexography printing. Preferably, the coating composition is applied by a screen printing process.

WO 2008/102303 A1 FIG. 1 schematically depicts a screen printing press comprising a rotating magnetic orienting cylinder (RMC). The printing press includes a substrate feeder feeding the substrate under the form of sheets to a screen printing group where specific patterns of a coating or layer comprising magnetic or magnetizable pigment particles are applied to the substrate by mean of one or more screen printing cylinders placed in succession along the printing path of the sheets. The freshly printed sheets carrying the wet and not yet hardened coating or layer comprising magnetic or magnetizable pigment particles are conveyed to the rotating magnetic orienting cylinder (RMC) comprising the one or more apparatuses described herein, where the magnetic or magnetizable pigment particles of the coating or layer described herein are aggregately oriented by the spinning permanent assemblies (PMA) (5). The sheets are then conveyed downstream to the hardening unit, where the oriented magnetic or magnetizable pigment particles are frozen in a substantially oriented state or oriented state. Preferably, the hardening unit is a UV-curing unit. Preferably, the hardening unit is disposed over the rotating magnetic orienting cylinder (RMC), as described in WO 2012/038531 A1 or EP 2433798 A1, so that the coating or layer comprising magnetic or magnetizable pigment particles is at least partially hardened while the substrate carrying the coating or layer is in contact with the rotating magnetic orienting cylinder (RMC), i.e. the coating or layer is subjected to an hardening step that occurs partially simultaneously with the step of exposing the coating or layer to the rotating magnetic field produced by spinning the permanent magnet assembly (PMA) (5) with the rotor and the stator so as to orient the magnetic or magnetizable pigment particles.

A subsequent hardening unit (radiation curing, preferably UV-curing, infrared and/or heat) may be disposed further downstream to provide for complete hardening of the coating or layer comprising magnetic or magnetizable pigment particles. Further details regarding screen printing presses can be found in EP 0723864 A1, WO 97/29912 A1, WO 2004/096545 A1 and WO 2005/095109 A1.

Subsequently, partially simultaneously (as described in WO 2012/038531 A1) or simultaneously, preferably partially simultaneously, with the orientation of the magnetic or magnetizable pigment particles by the rotating magnetic field generated by the spinning permanent magnet assembly (PMA) (5) of the apparatus described herein, the coating or layer comprising magnetic or magnetizable pigment particles is hardened to thereby fix or freeze the magnetic or magnetizable pigment particles in the substantially oriented state or oriented state. By "partially simultaneously", it is meant that both steps are partly performed simultaneously, i.e. the times of performing each of the steps partially overlap. In the context described herein, when hardening is performed partially simultaneously with the magnetic orientation, it must be understood that hardening becomes effective after the orientation so that the pigment particles orient before the complete hardening of the OEL. Therefore, to ensure that the coating or layer comprising the magnetic or magnetizable pigment particles is at least partially hardened partially simultaneously with the orientation of the magnetic or magnetizable pigment particles provided by the one or more apparatuses of the invention described herein, the hardening device may be arranged along the path of the substrate above the apparatus described herein.

The one or more apparatuses described herein provides a smooth surface for supporting a substrate carrying a coating or layer comprising magnetic or magnetizable pigment particles upon which a rotating magnetic field generated by the spinning permanent magnet assembly (PMA) (5) acts to aggregately orient the magnetic or magnetizable pigment particles to produce an optical effect. A cover plate may be used. The cover plate is preferably made of non-magnetic material such as austenitic steel, aluminum, titanium or an engineering plastic or polymer. WO 2008/102303 A2 discloses a suitable example of a cover plate. The cover plate described herein may be disposed around the rotating magnetic orienting cylinder (RMC) for supporting the substrate, said cover plate being provided with openings at the locations corresponding to the position of the one or more apparatuses described herein. Alternatively, the cover plate may provide the complete support surface, thus covering each of the one or more apparatuses described herein. In this case, the cover plate is made of a material having no magnetic permeability or having a low magnetic permeability.

The flatbed (FB) magnetic orienting printing unit comprising one or more apparatuses described herein is preferably part of a longitudinal, discontinuous printing press. The coating composition is preferably applied by a printing process preferably selected from the group consisting of screen printing and intaglio printing. Preferably, the coating composition is applied by a screen printing process.

The flatbed (FB) magnetic orienting printing unit comprises a flat printing screen and a printing platen for receiving the substrate under the form of sheets, and a magnetic orienting unit comprising the one or more apparatuses described herein. The printing press additionally comprises a hardening unit, preferably a UV-curing unit. The magnetic orienting unit is disposed below the upper surface of the printing platen. The one or more apparatuses described herein are concomitantly moveable from a first position away from the upper surface of the printing platen ("remote position") to a second position close to it ("close position"). Printing, orienting and at least partially hardening the coating or layer comprising magnetic or magnetizable pigment particles take place in the following sequence:

a sheet is manually or automatically loaded onto the upper surface of the printing platen with the apparatus in remote position,
  the printing screen is placed over the sheet, and the coating composition is applied onto selected parts of the sheet to form printed patterns,
  the printing screen is removed, and the one or more apparatuses of the invention described herein are moved in close position to the upper surface of the printing platen, at the location of the printed patterns,
  the spinning permanent magnet assemblies (PMA) (5) aggregately orient the magnetic or magnetizable pigment particles of the wet and not yet hardened coating or layer,
  while spinning, the one or more apparatuses described herein are moved away in remote position from the printing platen,
  the wet and not yet hardened coating or layer comprising the magnetic or magnetizable pigment particles is exposed to the hardening unit, where the pigment particles are frozen in a substantially oriented state or oriented state.

Further details regarding the process of printing and orienting magnetizable or magnetic pigment particles using a flatbed (FB) magnetic orienting printing unit may be found in WO 2010/066838 A1.

Preferably, the coating composition is an ink or coating composition selected from the group consisting of radiation curable compositions, thermally drying compositions, oxidatively drying compositions, and combinations thereof. Particularly preferably, the coating composition is an ink or coating composition selected from the group consisting of radiation curable compositions. Radiation curing, in particular UV-Vis curing, advantageously leads to a rapid increase in viscosity of the coating composition after exposure to the curing radiation, thus preventing any further movement of the pigment particles and in consequence any loss of orientation after the magnetic orientation step. EP 2024451 B1 discloses suitable inks for the present invention.

The methods and apparatuses described herein are particularly suitable for making optical effect layers in the field of security, cosmetic and/or decorative applications.

Also described herein are uses of the apparatus described herein or the rotating magnetic orienting cylinder (RMC) comprising the one or more apparatuses described herein or the flatbed (FB) magnetic orienting printing unit comprising the one or more apparatuses described herein for making an optical effect layer on the substrate, said substrate being preferably a security document or security article, preferably a security document.

The present invention provides a process for producing an optical effect layer (OEL) on a substrate. The process described herein comprises the steps i) applying, preferably by the printing process described herein, to the substrate described herein the coating composition comprising magnetic or magnetizable pigment particles described herein on the substrate described herein so as to form a substrate carrying a wet (not yet hardened) coating or layer comprising magnetic or magnetizable pigment particles or i) providing the substrate carrying the wet coating layer comprising the magnetic or magnetizable pigment particles described herein; ii) providing the apparatus or the magnetic orienting cylinder (RMC) or the flatbed (FB) magnetic orienting printing unit described herein; iii) exposing the coating or layer comprising the magnetic or magnetizable pigment particles to a time-dependent, direction-varying magnetic field produced by spinning the permanent magnet assembly (PMA) (5) through the combined action of the rotor (3a+3b) and the stator (1b+1c), to orient at least part of the magnetic or magnetizable pigment particles as described herein; and iv) at least partially hardening the coating or layer comprising the magnetic or magnetizable pigment particles so as to fix at least part of said magnetic or magnetizable pigment particles in a substantially oriented state or oriented state as described herein. The step iv) is preferably carried out partially simultaneously with step iii).

Also described herein are methods for protecting a security document. The method described herein comprises the steps of i) applying, preferably by a printing process described herein, the coating composition comprising magnetic or magnetizable pigment particles described herein on the substrate or security document described herein, ii) exposing the coating or layer comprising the magnetic or magnetizable pigment particles to the rotating magnetic field of apparatuses described herein or the rotating magnetic orienting cylinder (RMC) comprising the one or more apparatuses described herein or the flatbed (FB) magnetic orienting printing unit comprising the one or more apparatuses described herein so as to aggregately orient at least part of the magnetic or magnetizable pigment particles as described herein, in particular to produce rotationally symmetric optical effects, and iii) at least partially hardening the coating or layer comprising the magnetic or magnetizable pigment particles so as to fix said magnetic or magnetizable pigment particles in a substantially oriented state or oriented state as described herein. The step iv) is preferably carried out partially simultaneously with step iii).

The substrate described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. The substrate can comprise further additives that are known to the skilled person, such as fillers, sizing agents, whiteners, processing aids, reinforcing or wet strengthening agents, etc. When the OELs produced according to the present invention are used for decorative or cosmetic purposes including for example fingernail lacquers, said OEL may be produced on other type of substrates including nails, artificial nails or other parts of an animal or human being.

Should the OEL produced according to the present invention be on a security document or article, and with the aim of further increasing the security level and the resistance against counterfeiting and illegal reproduction of said security document or article, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step i) (i.e. step of applying, preferably by the printing process described herein, to the substrate described herein the coating composition comprising the magnetic or magnetizable pigment particles described herein). This may enhance the quality of the optical effect layer (OEL) described herein or promote adhesion. Examples of such primer layers may be found in WO 2010/058026 A2.

With the aim of increasing the durability through soiling or chemical resistance and cleanliness and thus the circulation lifetime of an article, a security document, security article or a decorative element or object comprising the optical effect layer (OEL) obtained by the process described herein, or with the aim of modifying their aesthetical appearance (e.g. optical gloss), one or more protective layers may be applied on top of the optical effect layer (OEL). When present, the one or more protective layers are typically made of protective varnishes. These may be transparent or slightly colored or tinted and may be more or less glossy. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the optical effect layer (OEL).

The present invention further provides optical effect layers (OEL) produced by the process according to the present invention.

The optical effect layer (OEL) described herein may be provided directly on a substrate on which it shall remain permanently (such as for banknote applications). Alternatively, an optical effect layer (OEL) may also be provided on a temporary substrate for production purposes, from which the OEL is subsequently removed. This may for example facilitate the production of the optical effect layer (OEL), particularly while the coating composition is still in a fluid state. Thereafter, after hardening the coating or layer made of the coating composition for the production of the optical effect layer (OEL), the temporary substrate may be removed from the OEL.

The present invention further provides security documents and security articles comprising the OEL obtained by the method described herein. Each security document or security article may comprise more than one OELs, i.e., during the printing and orienting process, more than one OEL may be produced on the same sheet or security document or security article.

Security documents or articles include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transaction cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronics articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals.

Alternatively, the OEL may be produced on an auxiliary substrate such as for example a security thread, security stripe, a foil, a decal, a window or a label and consequently transferred to a security document in a separate step.

Should an operator of the printing equipment want to exchange a broken part or produce other optical effects generated by magnetic fields, it is possible to easily replace one or more blocks comprising a non-spinneable or a spinneable permanent magnet assembly with one or more second block (B) comprising the casing (4), the titanium plate (2), the rotor (3a+3b) and the permanent magnet assembly (PMA) (5) described herein. It may also be possible to install one or more apparatuses described herein on a rotating magnetic orienting cylinder (RMC) or on a flatbed (FB) magnetic orienting printing unit comprising already installed blocks comprising non-spinneable or a spinneable permanent magnet assembly.

Also described herein are methods of modifying an existing rotating magnetic orienting cylinder (RMC) or flatbed (FB) magnetic orienting printing unit having one or more blocks comprising a non-spinneable or a spinneable permanent magnet assembly, the method comprising i) removing one or more blocks comprising a non-spinneable or a spinneable permanent magnet assembly from the rotating cylinder (RMC) or flatbed (FB) printing unit and ii) replacing them with one or more of the second blocks (B) described herein and comprising the casing (4), the titanium plate (2), the rotor (3a+3b) and the permanent magnet assembly (PMA) (5) described herein, wherein the one or more second blocks (B) are removeably fixed to the first block (A) comprising the holder (1a) having mounted thereto the stator (1b+1c). Due to the strong, large and efficient coupling between the stator (1b+1c) and the rotor (3a+3b) described herein obtained by the interpenetrating magnetic fields of the stator and the rotor described herein and the so-obtained torque-generating mechanism, the present invention advantageously provides a method to easily and rapidly exchange one or more blocks already installed in a printing machine, said existing blocks comprising a non-spinneable or a spinneable permanent magnet assembly which is specific to each printing job to another block such as the second blocks (B) described herein so as to either replace a broken block or to change the final design, i.e. the magnetic orientation of the magnetic or magnetizable pigment particles, to produce optical effect layers (OEL).

Described herein are methods of maintaining or modifying a rotating magnetic orienting cylinder (RMC) or flatbed (FB) magnetic orienting printing unit described herein. In an embodiment, the method comprises i) removing one or more of the second blocks (B) described herein and comprising the casing (4), the titanium plate (2), the rotor (3a+3b) and the permanent magnet assembly (PMA) (5) described herein by way of undoing the removeable fixation between the first block (A) and the already installed second block (B) and ii) replacing the one or more removed blocks second (B) with another one or more second blocks (B').

The method may additionally comprise i) removing the first block (A) comprising the stator (1b+1c) from the rotating magnetic orienting cylinder (RMC) or the flatbed (FB) magnetic orienting printing unit by undoing the removeable fixation between said first block (A) and ii) replacing the removed component with an alternative first block (A') such as those described herein.

In an embodiment, the second block (B) comprising the casing (4), the titanium plate (2), the rotor (3a+3b) and the permanent magnet assembly (PMA) (5) described herein is designed to be of the same size and shape as the already installed block comprising a non-spinneable or spinneable permanent magnet assembly to be changed, so as to occupy the same space in the rotating magnetic orienting cylinder (RMC) or the flatbed (FB) magnetic orienting printing unit.

Example

The Example has been carried out by using the UV-curable screen printing ink of the formula given in Table 1 below and the apparatus described herebelow.

TABLE 1

| Epoxyacrylate oligomer | 28% |
| --- | --- |
| Trimethylolpropane triacrylate monomer | 19.5% |
| Tripropyleneglycol diacrylate monomer | 20% |
| Genorad 16 (Rahn) | 1% |
| Aerosil 200 (Evonik) | 1% |
| Speedcure TPO-L (Lambson) | 2% |
| Irgacure ® 500 (BASF) | 6% |
| Genocure ® EPD (Rahn) | 2% |
| BYK ® 371 (BYK) | 2% |
| Tego Foamex N (Evonik) | 2% |
| 7-layer optically variable magnetic pigment particles (*) | 16.5% |

(*) 7-layer gold-to-green platelet-shaped optically variable magnetic pigment particles having a flake shape of diameter $d_{50}$ about 9.3 μm and thickness about 1 μm, obtained from JDS-Uniphase, Santa Rosa, CA.

An apparatus according to the present invention and depicted in FIG. 1-6 was used to orient the optically variable magnetic pigment particles of the ink described in Table 1. Said apparatus comprised:

i) a holder (1a) (external dimensions: 60 mm×40 mm×25 mm) made of aluminum, comprising a rectangular recess (40 mm×40 mm×12.5 mm) to receive a "H"-shaped casing (4) and a lid (8), and comprising a square cavity (36.5 mm×36.5 mm×6 mm) to receive a magnetic-field-guiding stator core (1c);

ii) a magnetic-field-guiding stator core (1c) (36 mm×36 mm×5 mm; see details in FIG. 3A-B) was milled out of pure iron (Armco) and insulated with a layer of urethane lacquer dried at 80° C. for two hours. The magnetic-fieldguiding stator core (1c) comprised n (n=6) annular winding slots (external diameter=10 mm, internal diameter=5 mm, depth=4 mm) disposed in a circle (diameter=25 mm) and a central hole for mounting purposes. N (n=6) 120 turns magnet-wire coils (1b) of enameled 0.20 mm self-bonding copper wire (POLYSOL 155 1×02 MM HG from Distrelec AG) were wound and fixed to a self-standing condition by a hot air treatment for about two minutes at 250° C. and inserted into the n (n=6) winding slots. The magnet-wire coils (1b) were wired together such as to form a 3-phase Y-scheme stator winding (u, v, w, u', v, w'), wherein each two opposite magnet-wire coils (u, u'), (v, v') (w, w') were electrically connected together such as to produce the same magnetic polarity at diametrically opposed locations. The stator winding was connected via 4 wires (U, V, W, GND) to a motor driver described hereabove;

iii) a sensorless BLDC motor driver running at 12V DC power (DRV11873EVM, from Texas Instruments);

iv) a winding protection plate (7) (36 mm×36 mm×0.5 mm) made of titanium, comprising a central mounting hole (10 mm diameter) and disposed on top of the magnetic-field-guiding stator core (1c), protecting the magnet-wire coils (1b) and the magnetic-field-guiding stator core (1c);

v) a single-piece "H"-shaped casing (4) (see FIG. 4A-B) (30 mm×30 mm×12.5 mm) made of titanium and having four corners pillars (height=12.5 mm, width=10 mm). The "H"-shaped casing (4) comprised a first and a second cavity delimited by a horizontal middle-plate having a thickness of 2 mm and being located at 7 mm from the top surface and 3.5 mm from the bottom surface of the "H"-shaped casing (4). The "H"-shaped casing (4) comprised a central circular hole (diameter=10 mm) for receiving a ceramic ball bearing (3c) (external diameter=10 mm, internal diameter=5 mm, height=3 mm) which was fixed with epoxy glue in this hole;

vi) a rotor protection plate (2) (30 mm×30 mm×0.5 mm) made of titanium, for closing the first cavity of the "H"-shaped casing (4);

vii) a rotor disc (3b) (see FIG. 2A-B) (diameter=30 mm, thickness 2 mm) made of iron (Armco) and comprising a central hub or protrusion with a M3-threaded hole (as illustrated in FIG. 2A) on its upper surface; the rotor disc (3b) comprised on its lower surface, m (m=8) cavities (diameter=7 mm, depth=1.2 mm), wherein m (m=8) permanent magnet poles (NdFeB N45 disc-shaped axially magnetized dipole magnets (3a) (diameter=6 mm, thickness=1 mm)) were glued with alternating North and South poles, yielding an octupolar NSNSNSNS circular lower face of the rotor disc (3b). The rotor disc (3b) was inserted into the first cavity of the H"-shaped casing (4), with the hub or protrusion protruding through the ceramic ball bearing (3c); viii) a disc-shaped magnet (6) support with a 3 mm mounting hole (diameter=30 mm, thickness=2 mm) made of aluminum and fixed with an M3 screw to the hub or protrusion of the rotor disc (3b);

ix) a permanent magnet assembly (PMA) (5) being a diametrically magnetized NdFeB N42 disc-shaped dipole magnet (diameter=30 mm, thickness=3 mm) and glued onto the magnet support; and x) a lid (8) (40 mm×40 mm×15 mm) made of PPS (polyphenylene sulfide), fitted into the rectangular recess of the holder (A) and comprising a recess (30 mm×30 mm×13 mm) to accommodate the "H"-shaped casing (4).

As shown in FIGS. 5 and 6, the first cavity of the "H"-shaped casing (4) comprised the rotor disc (3b), the m (m=8) permanent magnet poles (3a) and the second cavity comprised the disc-shaped magnetic support (6) and the permanent magnet assembly (PMA) (5).

The magnetic gap (G) given by the distance between the topmost surface of the stator (1b+1c), i.e. the top surface of the magnetic-field-guiding stator core (1c), and the lowest surface of the rotor, was about 2.0 mm, comprising noteworthy the combined thicknesses of the winding protection plate (7) and the titanium protection plate (2) (2×0.5 mm) and a about 1 mm free air gap between the lower surface of the rotor and the upper surface rotor protection plate (2).

A 40 mm×40 mm square sample was printed onto a fiduciary paper (Louisenthal) with the UV-curable screen printing ink of Table 1 with a laboratory screen printing device using a T90 screen so as to form a coating layer having a thickness of about 20 μm. While the ink was still in a wet and not yet hardened state, the substrate was placed on the apparatus described hereabove with the substrate surface not carrying the UV-curable screen printing ink facing the apparatus, so that the distance between the printed area and the permanent magnet assembly (PMA) (5) was about 3 mm, and allowed to spin for a few seconds at an estimated spinning frequency of about 60 Hz. The spinning axis of the permanent magnet assembly (PMA) (5) was perpendicular to the substrate surface. The ink was hardened in the rotating magnetic field of the apparatus upon exposure during 0.5 second to a UV LED (Phoseon FireFly 395 nm) positioned at a distance of about 50 mm from the top surface of the substrate carrying the UV-curable screen printing ink.

Figure 7:
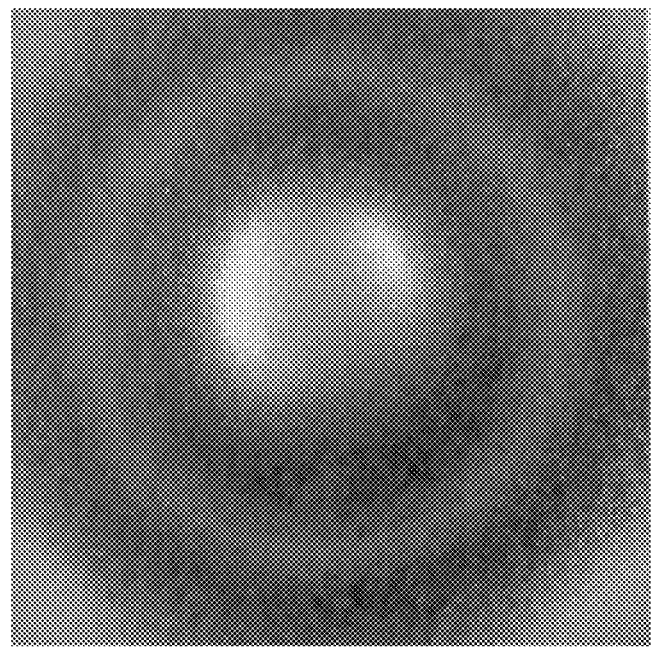
FIG. 7 shows an optical effect layer (OEL) obtained with the apparatus of the Example.

The photographic picture of the resulting OEL, representing a half-sphere, is shown in FIG. 7.

The invention claimed is:

1. An apparatus for producing an optical effect layer comprising:
 a) a first block comprising a1) a holder having mounted thereto a stator comprising n magnet-wire coils, disposed in n annular slots which are spaced from each other and arranged in a circle around the axis of a magnetic-field-guiding stator core; and a2) a winding protection plate disposed on top of the n magnet-wire coils; and
 b) a second block comprising:
  b1) a casing with disposed therein;
  b2) a rotor comprising m permanent magnet poles of alternating polarity arranged around a circle in or on one side of a rotor disc, wherein said m permanent magnet poles are spaced from each other;
  b3) a rotor protection plate, disposed below the m permanent magnet poles of the rotor, wherein said rotor protection plate covers the rotor from the side of the rotor disc; and
  b4) a permanent magnet assembly driven by the rotor, wherein said permanent magnet assembly is disposed on the opposite side of the rotor disc,
 wherein the rotor protection plate of the second block is disposed on an upper surface of the winding protection plate of the first block, and the winding protection plate is removeably coupled with the rotor protection plate,
 wherein the stator and the rotor act together as a brushless DC motor,
 wherein n is a multiple of 3 and m is a multiple of 2, provided that n/m is 3/2, 3/4, 6/4, 6/8, 9/8, 9/10, 12/10 or 12/14, and
 wherein the first block is configured to be removeably fixed to a base of a rotating magnetic orienting cylinder or a flatbed magnetic orienting printing unit, and
 wherein the second block is removeably fixed to the first block.

2. The apparatus of claim 1, further comprising a bearing in connection with the rotor disc.

3. The apparatus of claim 2, wherein the bearing is a ceramic ball bearing.

4. The apparatus of claim 1, further comprising a magnet support, wherein said magnet support is comprised in the second block and carries the permanent magnet assembly.

5. The apparatus of claim 1, further comprising a lid.

6. The apparatus of claim 1, wherein the casing is an H-shaped casing with a first cavity and a second cavity.

7. The apparatus of claim 6, wherein the rotor comprising the m permanent magnet poles of alternating polarity and the rotor disc are disposed within the first cavity of the H-shaped casing and wherein the permanent magnet assembly is disposed within the second cavity of the H-shaped casing.

8. A rotating magnetic orienting cylinder comprising one or more apparatuses recited in claim 1 mounted to the rotating magnetic orienting cylinder through the first block.

9. A flatbed magnetic orienting printing unit comprising one or more apparatuses recited in claim 1 mounted to the flatbed magnetic orienting printing unit through the first block.

10. A method of modifying an existing rotating magnetic orienting cylinder or a flatbed magnetic orienting printing unit having one or more first blocks and one or more third blocks comprising a non-spinneable or a spinneable permanent magnet assembly, the method comprising removing the one or more third blocks comprising the non-spinneable or spinneable permanent magnet assemblies from the rotating magnetic orienting cylinder or the flatbed magnetic orienting printing unit and replacing them with one or more second blocks recited in claim 1, wherein the one or more second blocks are removeably fixed to the one or more first blocks comprising a1) a holder having mounted thereto a stator comprising n magnet-wire coils disposed in n annular slots arranged in a circle around the axis of a magnetic-field-guiding stator core; and a2) a winding protection plate disposed on top of the n magnet-wire coils.

11. The apparatus of claim 1, wherein the rotor protection plate is a titanium rotor protection plate.

12. The apparatus of claim 1, wherein the winding protection plate is a titanium winding protection plate.

13. A method for producing an optical effect layer on a substrate, the method comprising:
  i) providing a substrate carrying a wet coating or layer comprising magnetic or magnetizable pigment particles;
  ii) providing the apparatus according to claim 1, or providing a rotating magnetic orienting cylinder comprising the apparatus according to claim 1 mounted to the rotating magnetic orienting cylinder through the first block, or providing a flatbed magnetic orienting printing unit comprising the apparatus according to claim 1 mounted to the flatbed magnetic orienting printing unit through the first block;
  iii) exposing the wet coating or layer comprising the magnetic or magnetizable pigment particles to a time-dependent, direction-varying magnetic field produced by spinning the permanent magnet assembly through a combined action of the rotor and the stator, to orient at least part of said magnetic or magnetizable pigment particles; and
  iv) at least partially hardening the coating or layer comprising the magnetic or magnetizable pigment particles such as to fix at least part of said magnetic or magnetizable pigment particles in a substantially oriented state or oriented state.

14. The method of claim 13, wherein the substrate is a security document.

15. The method of claim 13, wherein step iv) is carried out partially simultaneously with the step iii).

* * * * *